US012452570B2

(12) United States Patent
Kuroda et al.

(10) Patent No.: US 12,452,570 B2
(45) Date of Patent: Oct. 21, 2025

(54) AUDIOVISUAL PRESENTATION DEVICE AND SIGNAL PROCESSING DEVICE

(71) Applicant: SONY GROUP CORPORATION, Tokyo (JP)

(72) Inventors: Yoshiyuki Kuroda, Tokyo (JP); Go Igarashi, Tokyo (JP); Naoki Shinmen, Tokyo (JP); Masaki Kamata, Tokyo (JP); Kohei Asada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 220 days.

(21) Appl. No.: 18/251,740

(22) PCT Filed: Oct. 29, 2021

(86) PCT No.: PCT/JP2021/039944
§ 371 (c)(1),
(2) Date: May 4, 2023

(87) PCT Pub. No.: WO2022/102431
PCT Pub. Date: May 19, 2022

(65) Prior Publication Data
US 2023/0412955 A1 Dec. 21, 2023

(30) Foreign Application Priority Data
Nov. 13, 2020 (JP) ................................ 2020-189495

(51) Int. Cl.
*H04R 1/02* (2006.01)
*H04R 3/12* (2006.01)

(52) U.S. Cl.
CPC ............. *H04R 1/028* (2013.01); *H04R 1/026* (2013.01); *H04R 3/12* (2013.01)

(58) Field of Classification Search
CPC ........... H04R 1/028; H04R 1/026; H04R 3/12
See application file for complete search history.

(56) References Cited

U.S. PATENT DOCUMENTS 9,030,386 B2 * 5/2015 Park ....................... H04N 5/642 345/76
2018/0343519 A1 11/2018 Rakshit
(Continued)

FOREIGN PATENT DOCUMENTS

JP 2012-529073 A 11/2012
JP 2014-171610 A 9/2014
(Continued)

OTHER PUBLICATIONS

International Search Report and Written Opinion of PCT Application No. PCT/JP2021/039944, issued on Jan. 11, 2022, 08 pages of ISRWO.

*Primary Examiner* — Andrew Sniezek
(74) *Attorney, Agent, or Firm* — CHIP LAW GROUP

(57) ABSTRACT

An audiovisual presentation device and a signal processing device that enable a sound image to be localized on a video displayed on a higher-image-quality screen. A plurality of fine holes provided in a substrate of a display unit in which light-emitting elements for displaying a video are arranged in an array on the substrate, and an air chamber of a speaker unit from which sound is output according to an audio signal are connected by a plurality of sound conduits. Further, the audiovisual presentation device includes a plurality of opening/closing mechanisms for individually opening/closing the plurality of sound conduits, and a plurality of micro speakers arranged in an array on the substrate of the display unit to output a higher-frequency sound than speakers of the speaker unit.

13 Claims, 18 Drawing Sheets

(56) References Cited

U.S. PATENT DOCUMENTS

| | | | |
|---|---|---|---|
| 2019/0027534 | A1 | 1/2019 | Rotzoll et al. |
| 2019/0035567 | A1 | 1/2019 | O'Keeffe |

FOREIGN PATENT DOCUMENTS

| | | | |
|---|---|---|---|
| KR | 102090246 | B1 | 3/2020 |
| WO | 2008/093721 | A1 | 8/2008 |
| WO | 2010/140811 | A1 | 12/2010 |

* cited by examiner

AUDIOVISUAL PRESENTATION DEVICE AND SIGNAL PROCESSING DEVICE

CROSS REFERENCE TO RELATED APPLICATIONS

This application is a U.S. National Phase of International Patent Application No. PCT/JP2021/039944 filed on Oct. 29, 2021, which claims priority benefit of Japanese Patent Application No. JP 2020-189495 filed in the Japan Patent Office on Nov. 13, 2020. Each of the above-referenced applications is hereby incorporated herein by reference in its entirety.

TECHNICAL FIELD

The present disclosure relates to an audiovisual presentation device and a signal processing device, and more particularly to an audiovisual presentation device and a signal processing device capable of localizing a sound image on a video displayed on a higher-image-quality screen.

BACKGROUND ART

In general, it is believed that in moving image content that accompanies video with sound, localization of a sound image on the video displayed on the screen plays an important role in providing a sense of immersion in the content. Conventionally, by arranging sound sources such as speaker systems with respect to a screen, localization of a sound image on a video displayed on the screen has been realized.

For example, in movie theaters, a sound-transmitting screen is used to achieve localization of sound image on a video displayed on the screen. In other words, sound image localization on a video is performed with a configuration in which a sound source such as a speaker system is arranged on the back side of the screen (the side opposite to the surface where a video is projected by a projector), and the sound output from the sound source passes through the screen and reaches the viewer.

For example, PTL 1 discloses a sound-transmitting display device in which a multi-matrix speaker is arranged on the rear surface of a display panel, and in order to transmit sound emitted from the multi-matrix speaker, a plurality of holes are distributed at a uniform density on the display panel.

CITATION LIST

Patent Literature

[PTL 1]
Japanese Translation of PCT Application No. 2012-529073

SUMMARY

Technical Problem

By the way, in recent years, light-emitting diode (LED) displays have been developed as high-image-quality video presentation devices featuring high brightness, high dynamic range, high definition, and the like. Unlike the movie theater screens described above, the LED display does not have sound-transmitting properties, so it has been difficult to localize the sound image on the video.

In addition, the method of projecting a video on a sound-transmitting screen using a projector may impose restrictions on the installation environment. For example, in a bright environment such as outdoors, the image quality may deteriorate due to the influence of the light source. Therefore, it is demanded to localize the sound image on the video displayed on a high-image-quality video presentation device such as an LED display while avoiding such deterioration of image quality.

The present disclosure has been made in view of such circumstances, and is intended to enable a sound image to be localized on a video displayed on a higher-image-quality screen.

Solution to Problem

An audiovisual presentation device according to a first aspect of the present disclosure includes: a display unit in which light-emitting elements for displaying a video are arranged in an array on a substrate, and which has a plurality of fine holes formed in the substrate; a speaker unit having speakers that output sound according to an audio signal to an air chamber; and a plurality of sound conduits connecting the air chamber and the plurality of fine holes.

In the first aspect of the present disclosure, the plurality of fine holes provided in the substrate of the display unit in which light-emitting elements for displaying a video are arranged in an array on the substrate, and the air chamber of the speaker unit from which sound is output according to an audio signal are connected by a plurality of sound conduits.

A video and audio presentation device according to a second aspect of the present disclosure is a signal processing device for an audiovisual presentation device including: a display unit in which light-emitting elements for displaying a video are arranged in an array on a substrate, and which has a plurality of fine holes formed in the substrate; a speaker unit having speakers that output sound according to an audio signal to an air chamber; a plurality of sound conduits connecting the air chamber and the plurality of fine holes; a plurality of opening/closing mechanisms for individually opening/closing the plurality of sound conduits; and a plurality of micro speakers arranged in an array on the substrate of the display unit to output a higher-frequency sound than the speakers of the speaker unit, the signal processing device including: an opening/closing control unit that controls opening/closing by the plurality of opening/closing mechanisms; a selector unit that controls selection of the plurality of micro speakers; and a controller that controls the opening/closing control unit and the selector unit according to a position of a sound source on a video displayed on the display unit.

In the second aspect of the present disclosure, the audiovisual presentation device in which the plurality of fine holes provided in the substrate of the display unit in which light-emitting elements for displaying a video are arranged in an array on the substrate, and the air chamber of the speaker unit from which sound is output according to an audio signal are connected by a plurality of sound conduits are provided with the plurality of opening/closing mechanisms for individually opening/closing the plurality of sound conduits and the plurality of micro speakers arranged in an array on the substrate of the display unit to output a higher-frequency sound than the speakers of the speaker unit. The opening/closing control unit that controls the opening/closing of the plurality of opening/closing mechanisms and the selector unit that controls selection of the plurality of micro speakers are controlled according to the position of the sound source on the video displayed on the display unit.

DESCRIPTION OF EMBODIMENTS

Hereinafter, specific embodiments to which the present technology is applied will be described in detail with reference to the drawings.

First Configuration Example of Audiovisual Presentation Device

Figure 1:
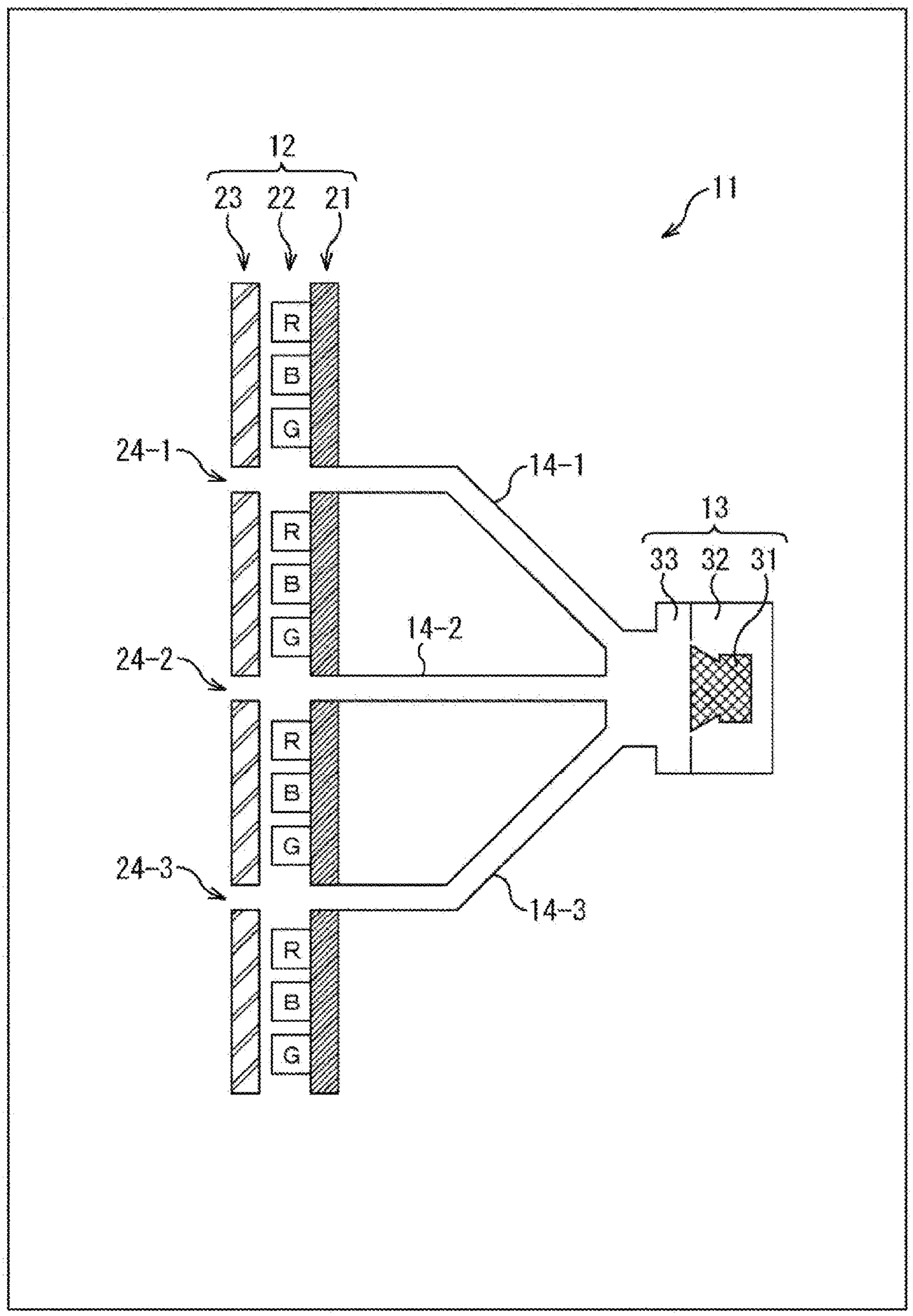
FIG. 1 is a diagram showing a configuration example of a first embodiment of an audiovisual presentation device to which the present technology is applied.

FIG. 1 is a diagram showing a configuration example of a first embodiment of an audiovisual presentation device to which the present technology is applied.

As shown in FIG. 1, an audiovisual presentation device 11 is configured by connecting a display unit 12 and a speaker unit 13 with a plurality of sound conduits 14. In the example shown in FIG. 1, the display unit 12 and the speaker unit 13 are connected by three sound conduits 14-1 to 14-3. However, a configuration using a larger number of sound conduits 14 may be employed according to the size of the audiovisual presentation device 11.

The display unit 12 is configured by laminating a circuit board 21, a light-emitting substrate 22, and a transparent substrate 23, and is provided with a plurality of fine holes 24.

The circuit board 21 is provided with a driving circuit for driving light emission in the light-emitting substrate 22. For example, LEDs are arranged in an array on the light-emitting substrate 22 as a plurality of light-emitting elements that emit red, green, and blue light, and a video is displayed by these LEDs emitting the light. The transparent substrate 23 is provided to protect the light-emitting substrate 22, and is made of, for example, low-reflection film glass.

The fine holes 24 are provided according to the number of sound conduits 14, and the sound conducted by the sound conduits 14 is radiated from the fine holes 24. In the example shown in FIG. 1, three fine holes 24-1 to 24-3 are provided such that the sound conduit 14-1 is connected to the fine hole 24-1, the sound conduit 14-2 is connected to the fine hole 24-2, and the sound conduit 14-3 is connected to the fine hole 24-3.

The speaker unit 13 is configured by providing a speaker body 31, an enclosure 32 and an air chamber 33. The speaker body 31 is housed in the enclosure 32 and outputs sound according to an audio signal to the air chamber 33 to which the sound conduits 14-1 to 14-3 are connected.

The sound conduits 14-1 to 14-3 conduct sounds output from the speaker unit 13 to the fine holes 24-1 to 24-3, respectively.

The audiovisual presentation device 11 is configured in this way, and the sound output from the speaker unit 13 is conducted through the sound conduits 14-1 to 14-3, and is output from the fine holes 24-1 to 24-3 of the display unit 12. Therefore, since the audiovisual presentation device 11 can output sound from the screen of the display unit 12, it is possible to localize the sound image on the video displayed on the screen.

In the audiovisual presentation device 11, the speaker unit 13 can be installed at a location away from the display unit 12 by using the sound conduits 14-1 to 14-3. This facilitates the use of a large display unit 12, for example, and is advantageous in that high sound pressure and low-frequency reproduction can be performed.

In the audiovisual presentation device 11, the speaker unit 13 has an air chamber 33, so that the speaker body 31 is arranged in the individual air chamber 33, and the air chamber 33 is connected to the fine holes 24-1 to 24-3 formed in the display unit 12 by the individual sound conduits 14-1 to 14-3. As a result, for example, the sound corresponding to the video displayed by the LEDs of the light-emitting substrate 22 around the fine holes 24-1 to 24-3 is output from the speaker body 31 disposed in the air chamber 33 connected to the individual fine holes 24-1 to 24-3, whereby localization can be improved. Therefore, the audiovisual presentation device 11 can enhance the effect of localizing the sound source on the video displayed on the display unit 12 (that is, the effect of matching the video and the sound).

Second Configuration Example of Audiovisual Presentation Device

Figure 2:
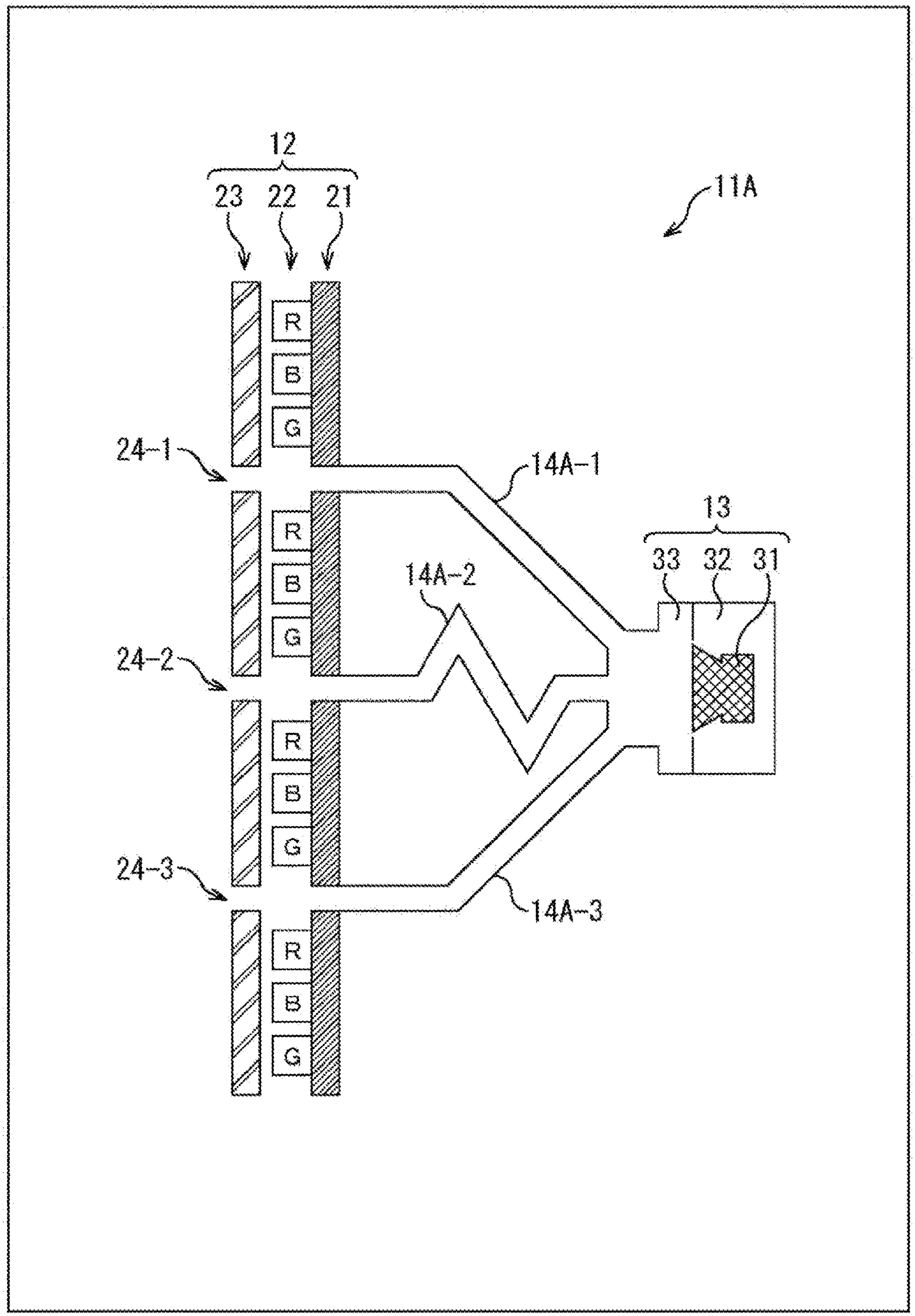
FIG. 2 is a diagram showing a configuration example of a second embodiment of an audiovisual presentation device.

FIG. 2 is a diagram illustrating a configuration example of a second embodiment of an audiovisual presentation device to which the present technology is applied.

In an audiovisual presentation device 11A shown in FIG. 2, the same reference numerals are assigned to the components common to the audiovisual presentation device 11 in FIG. 1, and detailed description thereof will be omitted. That is, the audiovisual presentation device 11A has a configuration common to that of the audiovisual presentation device 11 in FIG. 1 in that it includes the display unit 12 and the speaker unit 13. On the other hand, in the audiovisual presentation device 11A, the sound conduits 14A-1 to 14A-3 connecting the display unit 12 and the speaker unit 13 have a different configuration from that of the audiovisual presentation device 11 in FIG. 1.

The sound conduits 14A-1 to 14A-3 are formed so that the path lengths (the lengths of the sound conducting paths) from the air chamber 33 of the speaker unit 13 to the fine holes 24-1 to 24-3 are substantially the same. It is formed. That is, the sound conduits 14A-1 to 14A-3 are configured so that the sounds output from the speaker unit 13 are radiated from the fine holes 24-1 to 24-3 with substantially the same delay.

In the audiovisual presentation device 11A configured in this way, by aligning the path lengths of the sound conduits 14A-1 to 14A-3, it is possible to avoid the sounds radiated from the fine holes 24-1 to 24-3 from having time differences (or the time difference can be minimized). As a result, the audiovisual presentation device 11A can reduce a sense of strangeness (for example, variation in sound) that occurs when there is a time difference between the sounds emitted from the fine holes 24-1 to 24-3.

Third Configuration Example of Audiovisual Presentation Device

Figure 3:
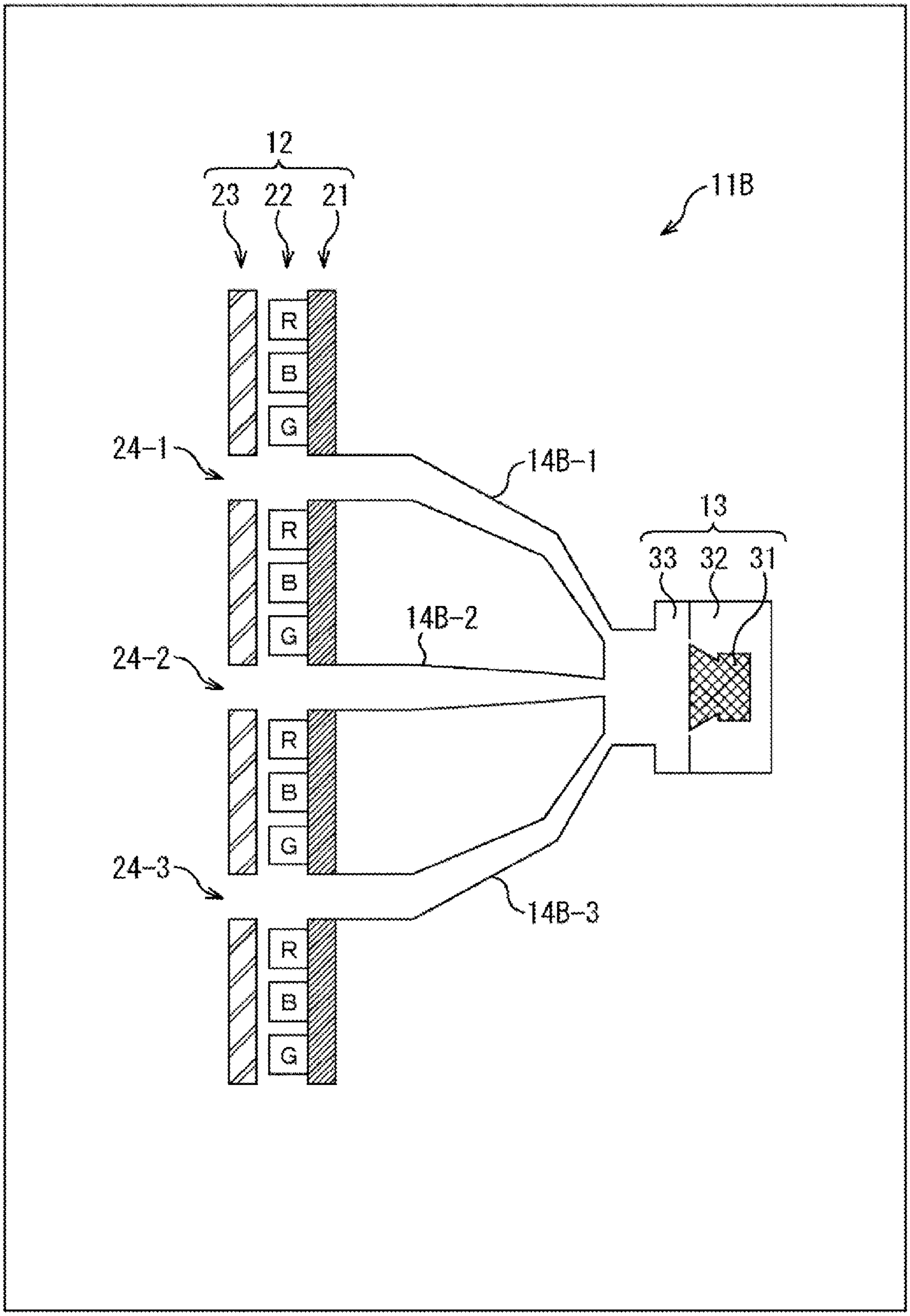
FIG. 3 is a diagram showing a configuration example of a third embodiment of an audiovisual presentation device.

FIG. 3 is a diagram illustrating a configuration example of a third embodiment of an audiovisual presentation device to which the present technology is applied.

In an audiovisual presentation device 11B shown in FIG. 3, the same reference numerals are assigned to the components common to the audiovisual presentation device 11 in FIG. 1, and detailed description thereof will be omitted. In other words, the audiovisual presentation device 11B has a configuration common to that of the audiovisual presentation device 11 in FIG. 1 in that it includes the display unit 12 and the speaker unit 13. On the other hand, in the audiovisual presentation device 11B, the sound conduits 14B-1 to 14B-3 connecting the display unit 12 and the speaker unit 13 have a difference configuration from that of the audiovisual presentation device 11 in FIG. 1.

The sound conduits 14B-1 to 14B-3 are formed in a shape of a so-called horn shape whose inner diameter increases from the air chamber 33 of the speaker unit 13 toward the fine holes 24-1 to 24-3.

In the audiovisual presentation device 11B configured in this manner, the sound conduits 14B-1 to 14B-3 are formed into a horn shape, so that the directivity and the efficiency of the sound emitted from the fine holes 24-1 to 24-3 can be controlled.

Fourth Configuration Example of Audiovisual Presentation Device

Figure 4:
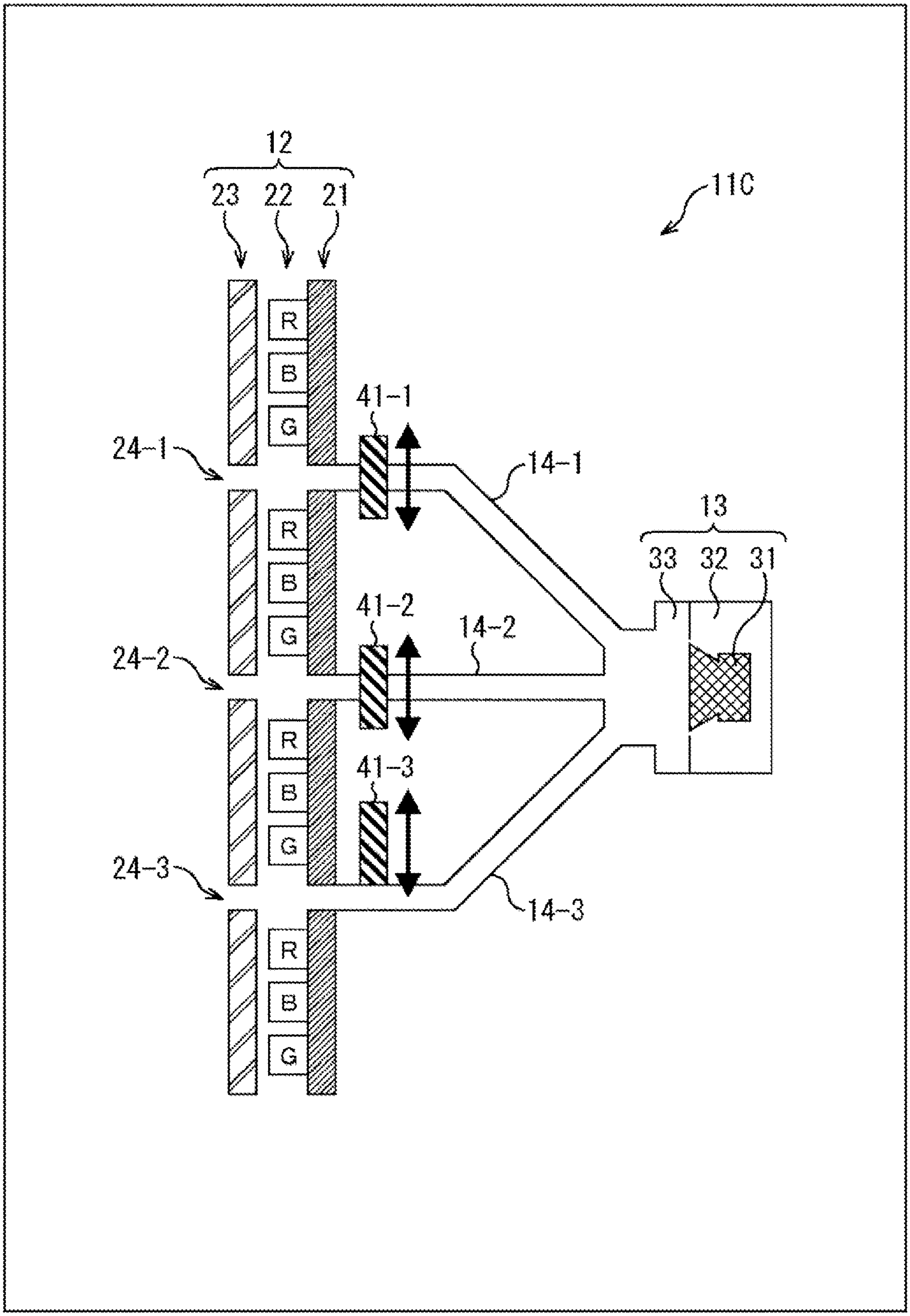
FIG. 4 is a diagram showing a configuration example of a fourth embodiment of an audiovisual presentation device.

FIG. 4 is a diagram illustrating a configuration example of a fourth embodiment of an audiovisual presentation device to which the present technology is applied.

In an audiovisual presentation device 11C shown in FIG. 4, the same reference numerals are assigned to the components common to the audiovisual presentation device 11 in FIG. 1, and detailed description thereof will be omitted. That is, the audiovisual presentation device 11C has a configuration common to that of the audiovisual presentation device 11 in FIG. 1 in that it includes the display unit 12, the speaker unit 13, and the sound conduits 14-1 to 14-3. On the other hand, the audiovisual presentation device 11C has a configuration different from that of the audiovisual presentation device 11 in FIG. 1 in that opening/closing mechanisms 41-1 to 41-3 are provided for the sound conduits 14-1 to 14-3, respectively.

The opening/closing mechanisms 41-1 to 41-3 are provided for the sound conduits 14-1 to 14-3, respectively, so as to individually open and close the sound conduits 14-1 to 14-3. That is, the opening/closing mechanism 41-1 opens and closes the sound conduit 14-1, the opening/closing mechanism 41-2 opens and closes the sound conduit 14-2, and the opening/closing mechanism 41-3 opens and closes the sound conduit 14-3.

The audiovisual presentation device 11C configured in this manner dynamically and independently controls the opening/closing of the sound conduits 14-1 to 14-3 by the opening/closing mechanisms 41-1 to 41-3, so that the fine holes 24-1 to 24-3 that serve as the sound source positions on the display unit 12 can be selected arbitrarily. In this way, for example, the audiovisual presentation device 11C can realize a plurality of sound source positions with one speaker unit 13. In addition, by dynamically and independently controlling the opening/closing of the sound conduits 14-1 to 14-3 by the opening/closing mechanisms 41-1 to 41-3, the localization of the sound output can be further enhanced.

Fifth Configuration Example of Audiovisual Presentation Device

Figure 5:
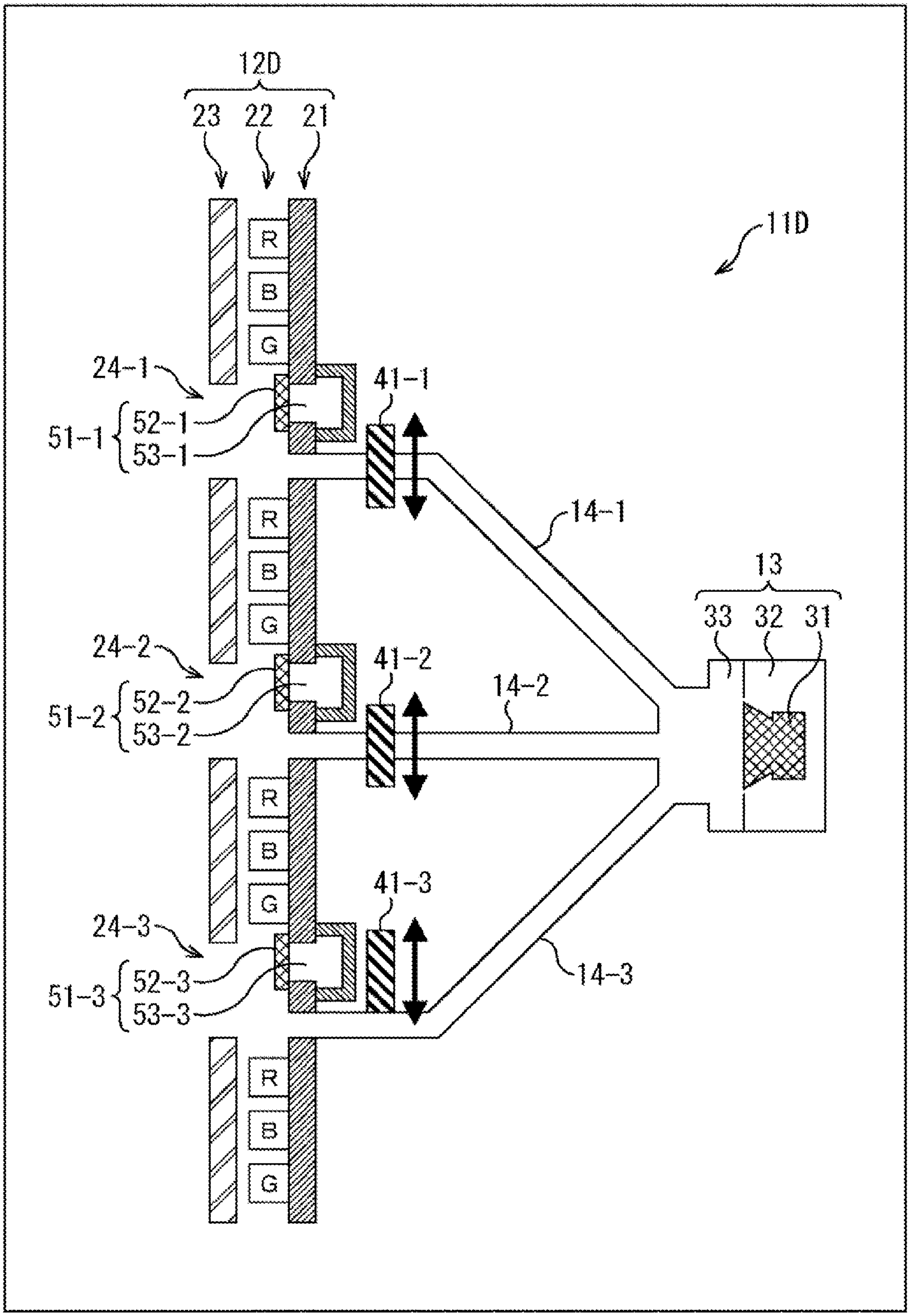
FIG. 5 is a diagram showing a configuration example of a fifth embodiment of an audiovisual presentation device.

FIG. 5 is a diagram showing a configuration example of a fifth embodiment of an audiovisual presentation device to which the present technology is applied.

In an audiovisual presentation device 11D shown in FIG. 5, the same reference numerals are assigned to the components common to the audiovisual presentation device 11 in FIG. 1, and detailed description thereof will be omitted. That is, the audiovisual presentation device 11D has a configuration common to the audiovisual presentation device 11 in FIG. 1 in that it includes a speaker unit 13 and sound conduits 14-1 to 14-3. On the other hand, the audiovisual presentation device 11D has a different configuration from that of the audiovisual presentation device 11 in FIG. 1 in that the opening/closing mechanisms 41-1 to 41-3 are provided in the same manner as the audiovisual presentation device 11C in FIG. 4 and a display unit 12D has a different structure.

The display unit 12D is configured such that the micro speakers 51-1 to 51-3 that output higher-frequency sound than the speaker body 31 of the speaker unit 13 are provided on the circuit board 21 for the respective fine holes 24-1 to 24-3. For example, individual micro speakers 51 include a speaker element 52 that outputs sound and an independent enclosure 53, and has a small size of 1 mm or less in diameter.

The audiovisual presentation device 11D configured in this way can reproduce middle and low frequency sounds by the speaker unit 13, and reproduce high frequency sounds by the micro speakers 51-1 to 51-3. For example, due to the structure of conducting sound through the sound conduits 14-1 to 14-3, the sound output from the speaker unit 13 is likely to be attenuated in high frequencies. Therefore, the audiovisual presentation device 11D can improve the high-frequency characteristics by using the micro speakers 51-1 to 51-3 together.

Further, in the display unit 12D, the micro speakers 51-1 to 51-3 are configured to reproduce only high frequencies, so that the area of the diaphragm can be reduced. Therefore, the area occupied by the micro speakers 51-1 to 51-3 in the display unit 12D can be minimized.

Figure 6:
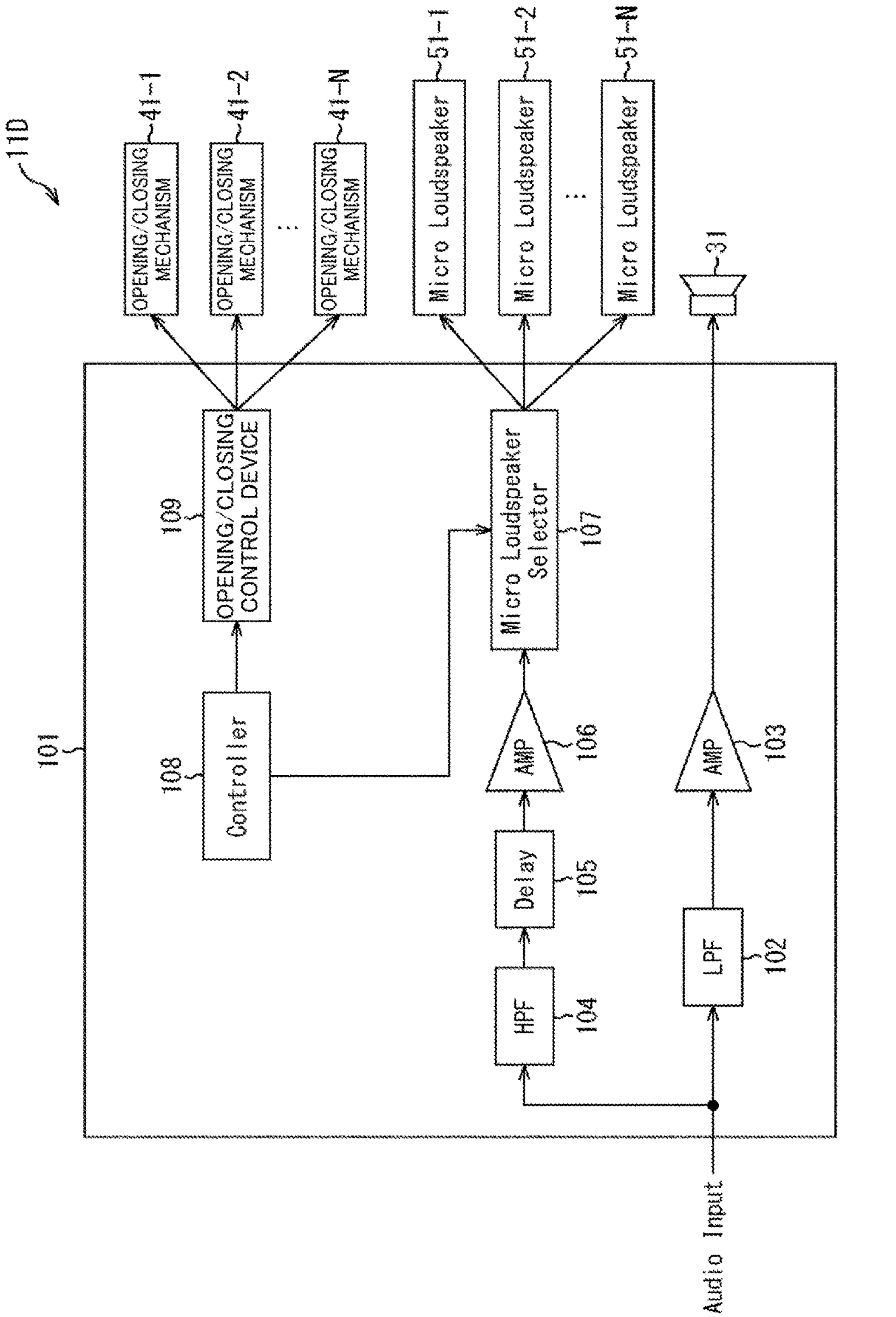
FIG. 6 is a block diagram showing a configuration example of a signal processing device.

FIG. 6 is a block diagram showing a configuration example of a signal processing device that performs signal processing on an audio signal supplied to the audiovisual presentation device 11D.

As shown in FIG. 6, a signal processing device 101 includes a low-pass filter 102, an amplifier 103, a high-pass filter 104, a delay element 105, an amplifier 106, a selector 107, a controller 108, and an opening/closing control device 109.

An audio signal (Audio Input) input to the signal processing device 101 is supplied to the low-pass filter 102 and the high-pass filter 104. The low-pass filter 102 passes only the low frequency band of the audio signal and supplies it to the amplifier 103, and the audio signal amplified by the amplifier 103 is supplied to the speaker body 31.

The high-pass filter 104 passes only the high frequency band of the audio signal and supplies it to the delay element 105, and after a predetermined delay time has passed in the delay element 105, the audio signal is supplied to the amplifier 106. An audio signal amplified by the amplifier 106 is supplied to the selector 107, and the audio signal is supplied to the micro speaker 51 selected from among the N micro speakers 51-1 to 51-N under the control of the controller 108.

The controller 108 controls the opening/closing control device 109 and the selector 107 so that sound is output from the position of the sound source in accordance with the position of the sound source on the video displayed on the display unit. The opening/closing control device 109 controls opening/closing by a plurality of opening/closing mechanisms 41-1 to 41-N.

The signal processing device 101 is configured in this manner, and the fine holes 24 for outputting sound out of the fine holes 24-1 to 24-N are selected by using the opening/closing mechanisms 41-1 to 41-N. In this case, if the lengths of the sound conduits 14-1 to 14-N are different, it is possible to align the sound output timings by giving appropriate delays to each sound. Further, the signal processing device 101 can select the micro speakers 51-1 to 51-N which reproduce sound in conjunction with the fine holes 24-1 to 24-N opened and closed by the opening/closing mechanisms 41-1 to 41-N using the selector 107.

An example of a control method for the micro speaker 51 will be described with reference to FIG. 7.

For example, since the maximum sound pressure per micro speaker 51 is limited, a control method of dynamically changing the number of micro speakers 51 to be driven according to the desired sound pressure for the entire audiovisual presentation device 11D can be adopted.

Figure 7:
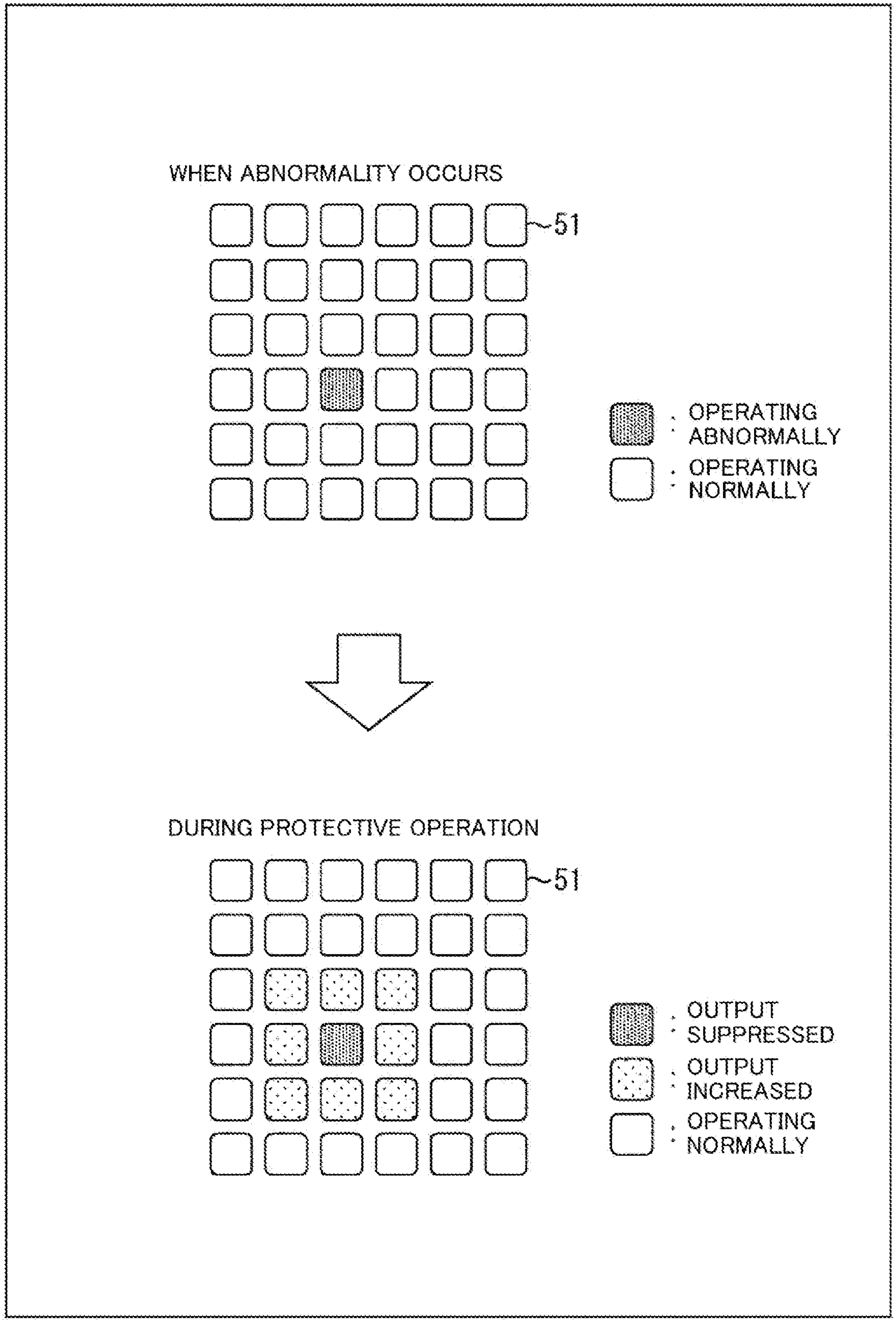
FIG. 7 is a diagram for explaining an example of a method for controlling a micro speaker.

Here, as shown in the upper part of FIG. 7, it is assumed that an abnormal operation such as excessive output or abnormal heat generation occurs in one micro speaker 51 out of the plurality of micro speakers 51 arranged in an array. In this case, it is assumed that the micro speakers other than the abnormally operating micro speaker 51 are operating normally.

In such a case, as shown in the lower part of FIG. 7, by suppressing the output of the abnormally operating micro speaker 51 and increasing the output of the surrounding micro speakers 51, the output suppression of the abnormally operating micro speaker 51 is covered. Further, the other micro speakers 51 are normally operated.

With such a control method, the audiovisual presentation device 11D can reproduce normal sound as a whole even if the micro speaker 51 operates abnormally.

Sixth Configuration Example of Audiovisual Presentation Device

Figure 8:
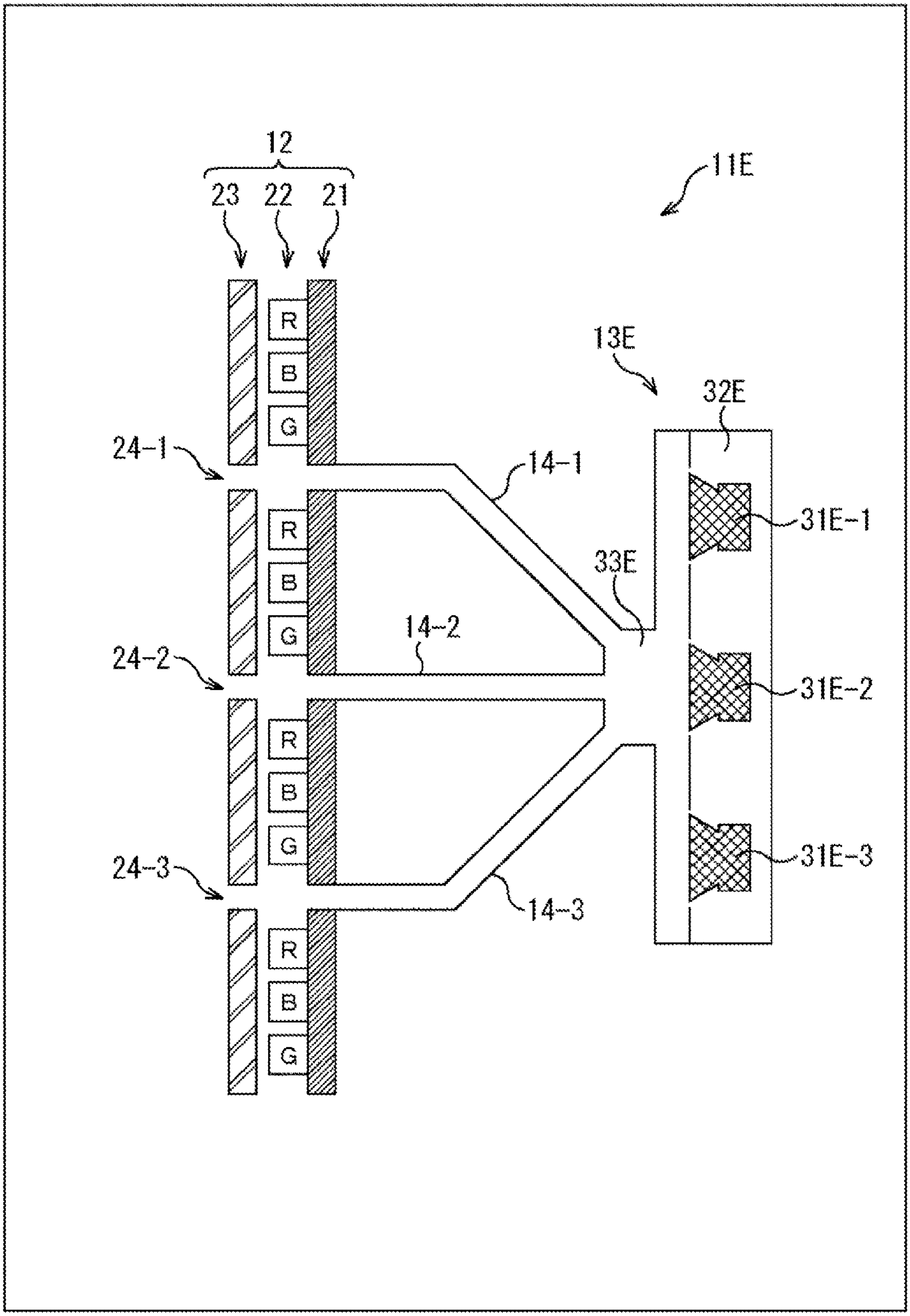
FIG. 8 is a diagram showing a configuration example of a sixth embodiment of an audiovisual presentation device.

FIG. 8 is a diagram illustrating a configuration example of a sixth embodiment of an audiovisual presentation device to which the present technology is applied.

In an audiovisual presentation device 11E shown in FIG. 8, the same reference numerals are assigned to the components common to the audiovisual presentation device 11 in FIG. 1, and detailed description thereof will be omitted. That is, the audiovisual presentation device 11E has a configuration common to that of the audiovisual presentation device 11 in FIG. 1 in that it includes a display unit 12 and sound conduits 14-1 to 14-3. On the other hand, in the audiovisual presentation device 11D, the structure of the speaker unit 13E is different from that of the audiovisual presentation device 11 in FIG. 1.

The speaker unit 13E is configured to include a plurality of speaker bodies 31E. In the example shown in FIG. 8, the speaker unit 13E includes three speaker bodies 31E-1 to 31E-3 housed in a common enclosure 32E, and is configured to output sounds according to an audio signal to one air chamber 33E. Further, the speaker bodies 31E-1 to 31E-3 may have characteristics of outputting sounds in mutually overlapping frequency bands, or characteristics of outputting sounds in different frequency bands. Further, the speaker bodies 31E-1 to 31E-3 can also be used as backups in case one of them breaks down.

Figure 9:
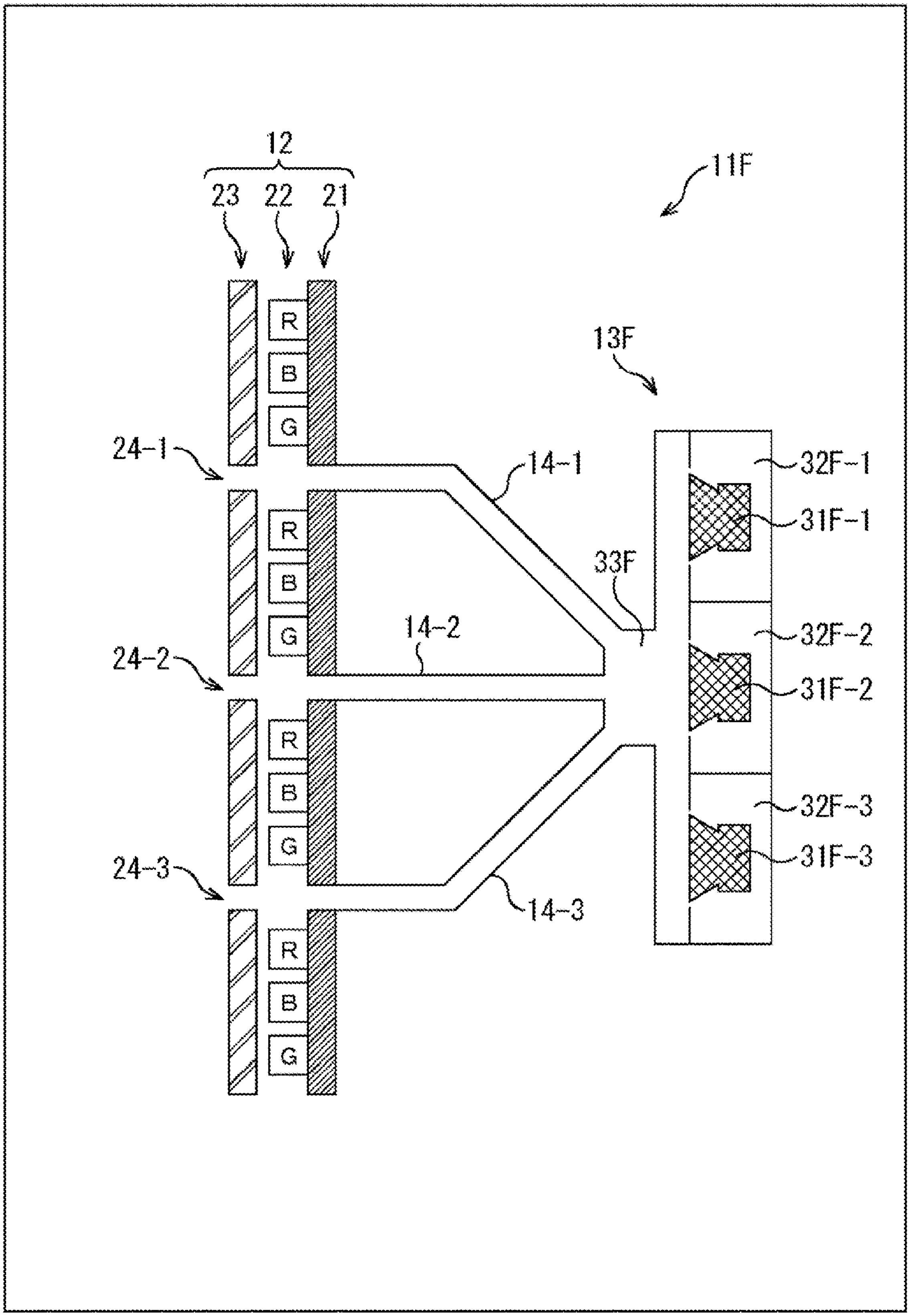
FIG. 9 is a diagram showing a modification of the sixth embodiment of the audiovisual presentation device.

Further, FIG. 9 shows a modification of the configuration example of the sixth embodiment of the audiovisual presentation device. That is, in an audiovisual presentation device 11F shown in FIG. 9, the speaker unit 13F is configured such that the three speaker bodies 31F-1 to 31F-3 are housed in separate enclosures 32F-1 to 32F-3, respectively.

It should be noted that a single sound conduit 14 may be provided so that one air chamber 33 is connected to only one fine hole 24.

Seventh Configuration Example of Audiovisual Presentation Device

Figure 10:
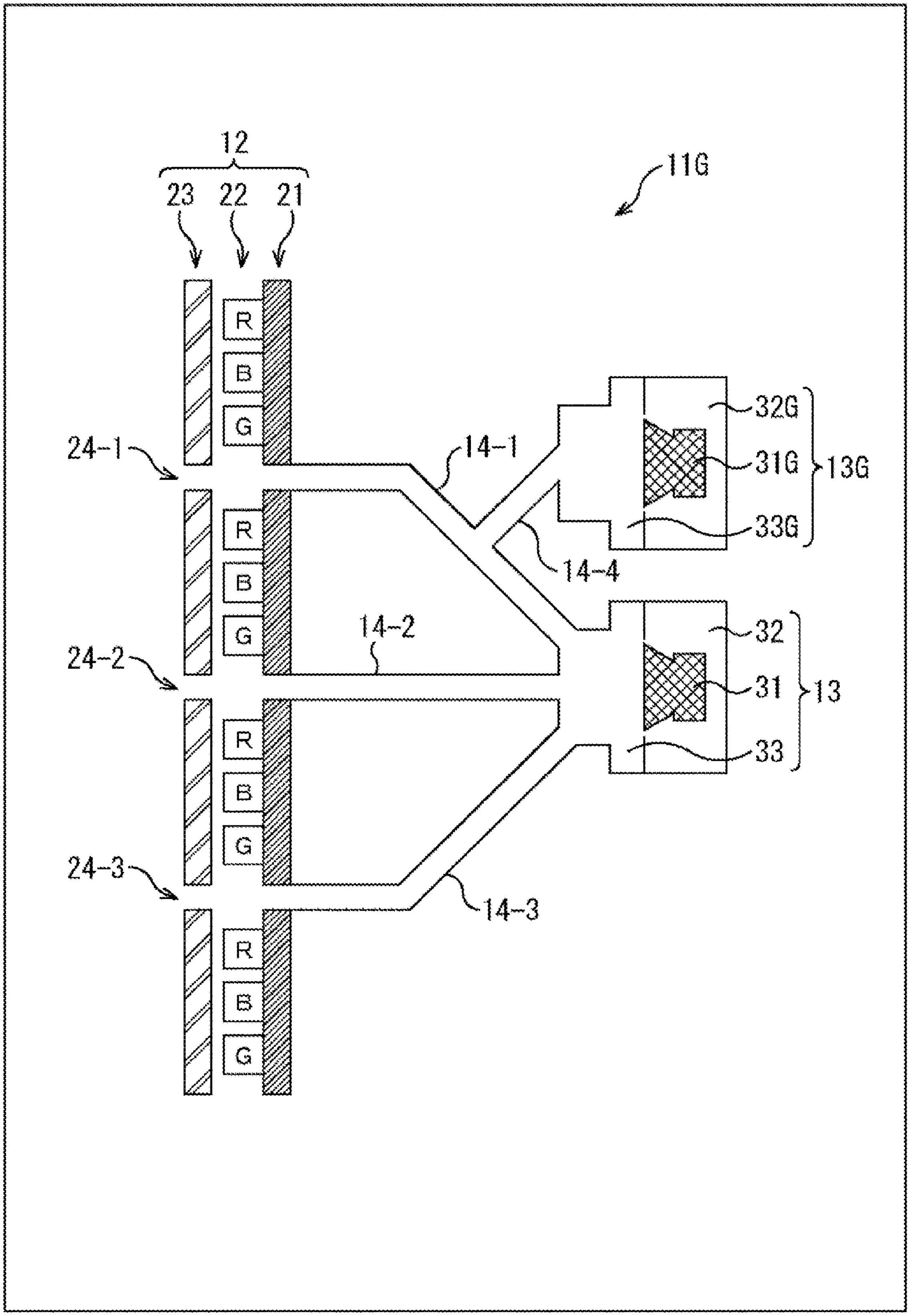
FIG. 10 is a diagram showing a configuration example of a seventh embodiment of an audiovisual presentation device.

FIG. 10 is a diagram illustrating a configuration example of a seventh embodiment of an audiovisual presentation device to which the present technology is applied.

In an audiovisual presentation device 11G shown in FIG. 10, the same reference numerals are assigned to the components common to the audiovisual presentation device 11 in FIG. 1, and detailed description thereof will be omitted. That is, the audiovisual presentation device 11G has a configuration common to that of the audiovisual presentation device 11 in FIG. 1 in that it includes the display unit 12, the speaker unit 13, and the sound conduits 14-1 to 14-3. On the other hand, the audiovisual presentation device 11G has a configuration different from that of the audiovisual presentation device 11 in FIG. 1 in that it includes another speaker unit 13G separate from the speaker unit 13.

The speaker unit 13G is provided independently of the speaker unit 13, and the air chamber 33G of the speaker unit 13G is connected to the middle of the sound conduit 14-1 by the sound conduit 14-4. Similarly, an independent speaker unit 13 (not shown) may be connected to a desired sound conduit 14 so as to provide an independent speaker unit 13 connected to the middle of the sound conduit 14-2 or 14-3.

In the audiovisual presentation device 11G configured in this manner, the speaker body 31 of the speaker unit 13 and the speaker body 31G of the speaker unit 13G may be configured to output sounds of different frequency bands.

Eighth Configuration Example of Audiovisual Presentation Device

Figure 11:
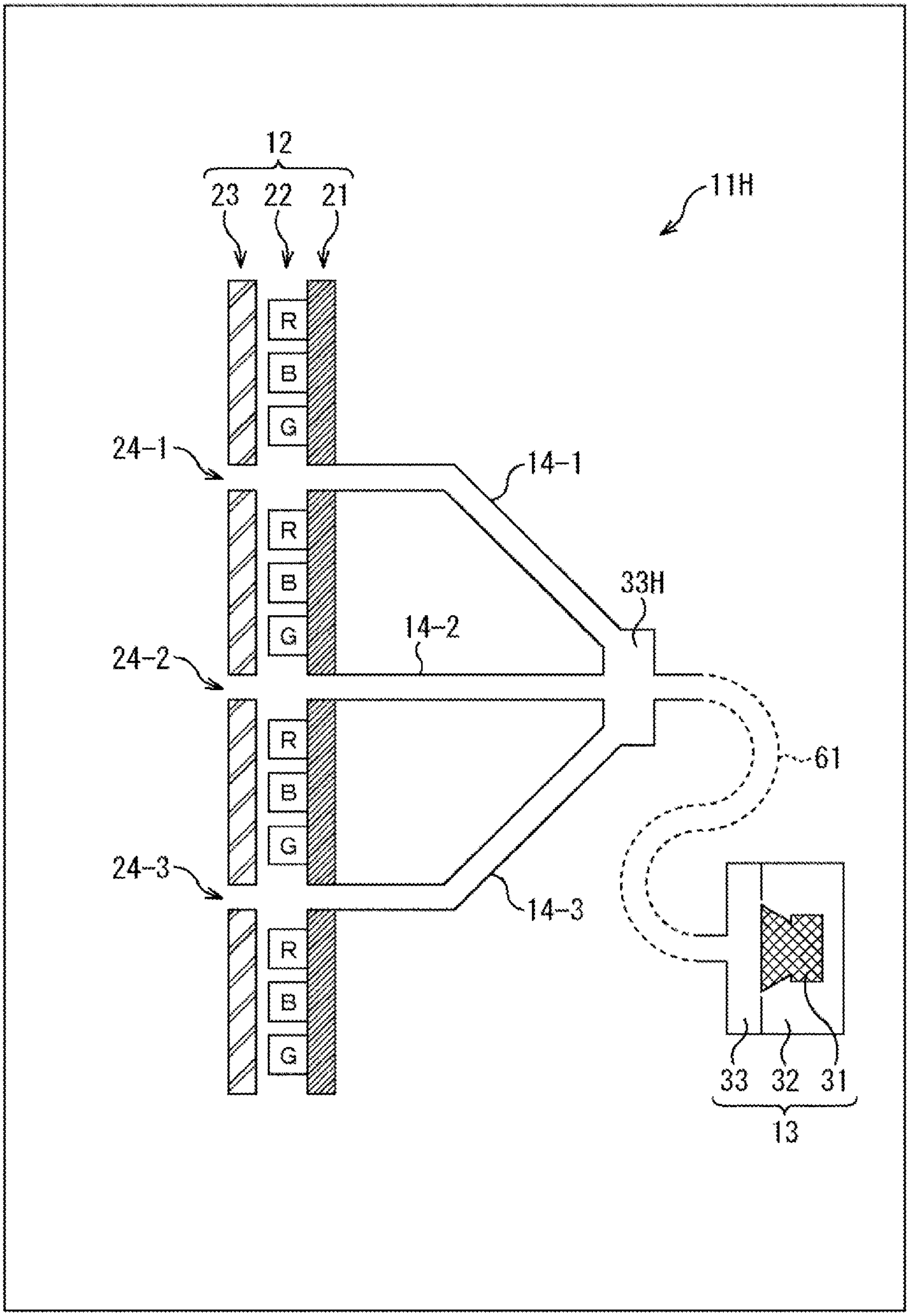
FIG. 11 is a diagram showing a configuration example of an eighth embodiment of an audiovisual presentation device.

FIG. 11 is a diagram illustrating a configuration example of an eighth embodiment of an audiovisual presentation device to which the present technology is applied.

In an audiovisual presentation device 1111 shown in FIG. 11, the same reference numerals are assigned to the components common to the audiovisual presentation device 11 in FIG. 1, and detailed description thereof will be omitted. That is, the audiovisual presentation device 1111 has a configuration common to that of the audiovisual presentation device 11 in FIG. 1 in that it includes the display unit 12, the speaker unit 13, and the sound conduits 14-1 to 14-3. On the other hand, the audiovisual presentation device 1111 has a configuration different from that of the audiovisual presentation device 11 in FIG. 1 in that the display unit 12, the sound conduits 14-1 to 14-3, and the speaker unit 13 are configured separately.

That is, the audiovisual presentation device 1111 is configured such that the air chamber 33 of the speaker unit 13 and the air chamber 3311 to which the sound conduits 14-1 to 14-3 are connected are connected by a flexible sound conduit 61. If the display unit 12 and the sound conduits 14-1 to 14-3 and the speaker unit 13 are configured separately, their connection configuration is not limited to the sound conduit 61, and an arbitrary connection configuration can be adopted.

The audiovisual presentation device 1111 configured in this manner can increase the degree of freedom in the arrangement of the speaker units 13.

Ninth Configuration Example of Audiovisual Presentation Device

Figure 12:
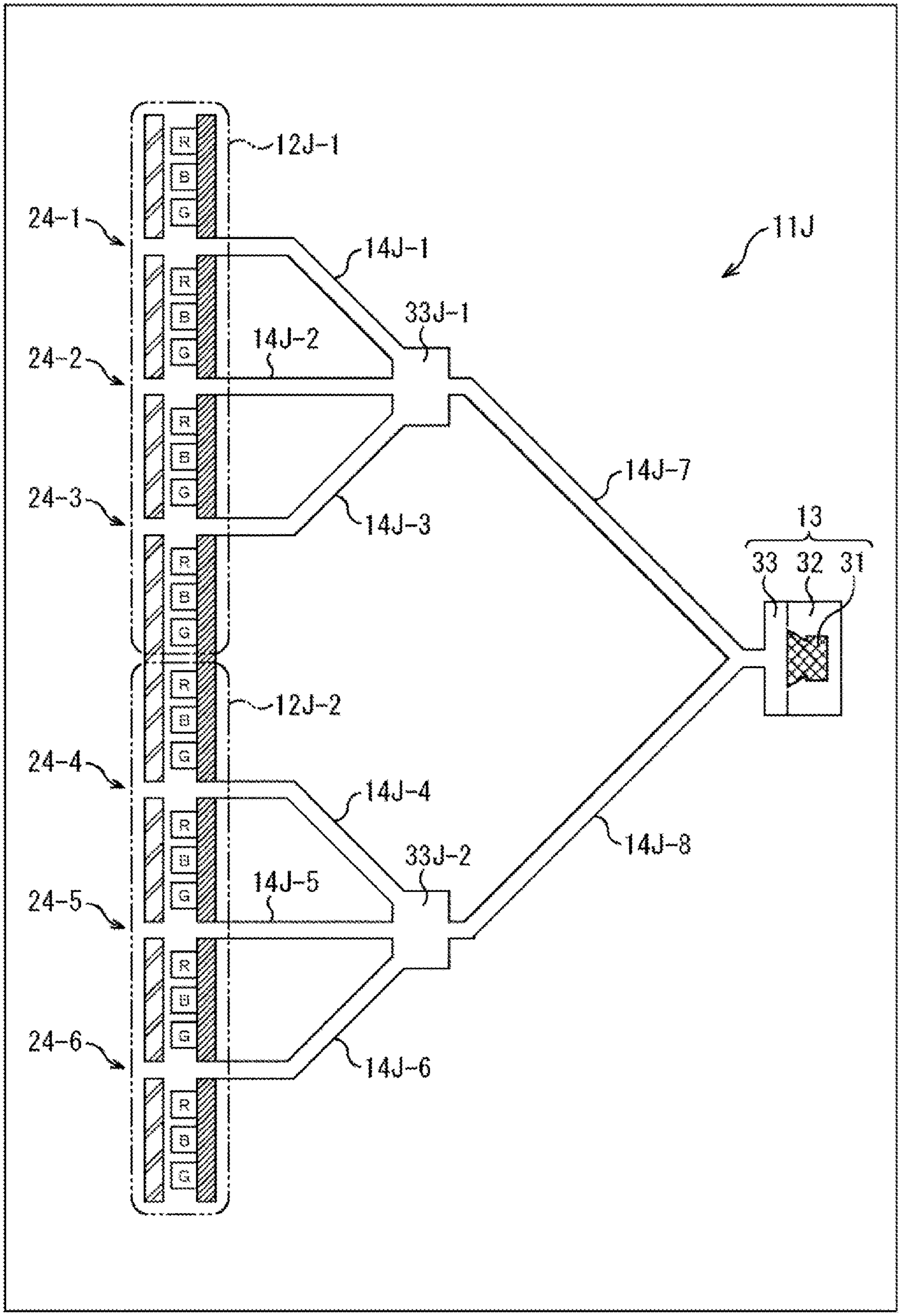
FIG. 12 is a diagram showing a configuration example of a ninth embodiment of an audiovisual presentation device.

FIG. 12 is a diagram showing a configuration example of a ninth embodiment of an audiovisual presentation device to which the present technology is applied.

In an audiovisual presentation device 11J shown in FIG. 12, the same reference numerals are assigned to the components common to the audiovisual presentation device 11 in FIG. 1, and detailed description thereof will be omitted. That is, the audiovisual presentation device 11J has a configuration common to that of the audiovisual presentation device 11 in FIG. 1 in that it includes the speaker unit 13. On the other hand, the audiovisual presentation device 11J includes a plurality of display units 12J, and sound conduits 14J-1 to 14J-8 connecting the display units 12J and the speaker units 13 have a different configuration from that of the audiovisual presentation device 11 of FIG. 1.

In the example shown in FIG. 12, the audiovisual presentation device 11J is configured to include two display units 12J-1 and 12J-2. The fine holes 24-1 to 24-3 of the display unit 12J-1 are connected to the air chamber 33J-1 by sound conduits 14J-1 to 14J-3. Similarly, the micro holes 24-4 to 24-6 of the display unit 12J-2 are connected to the air chamber 33J-2 by sound conduits 14J-4 to 14J-6. The air chamber 33 of the speaker unit 13 is connected to the air chamber 33J-1 by the sound conduit 14J-7 and to the air chamber 33J-2 by the sound conduit 14J-8.

Thus, the audiovisual presentation device 11J is configured such that one speaker unit 13 is connected to two display units 12J-1 and 12J-2. It should be noted that the speaker unit 13 may be connected to two or more display units 12J.

Figure 13:
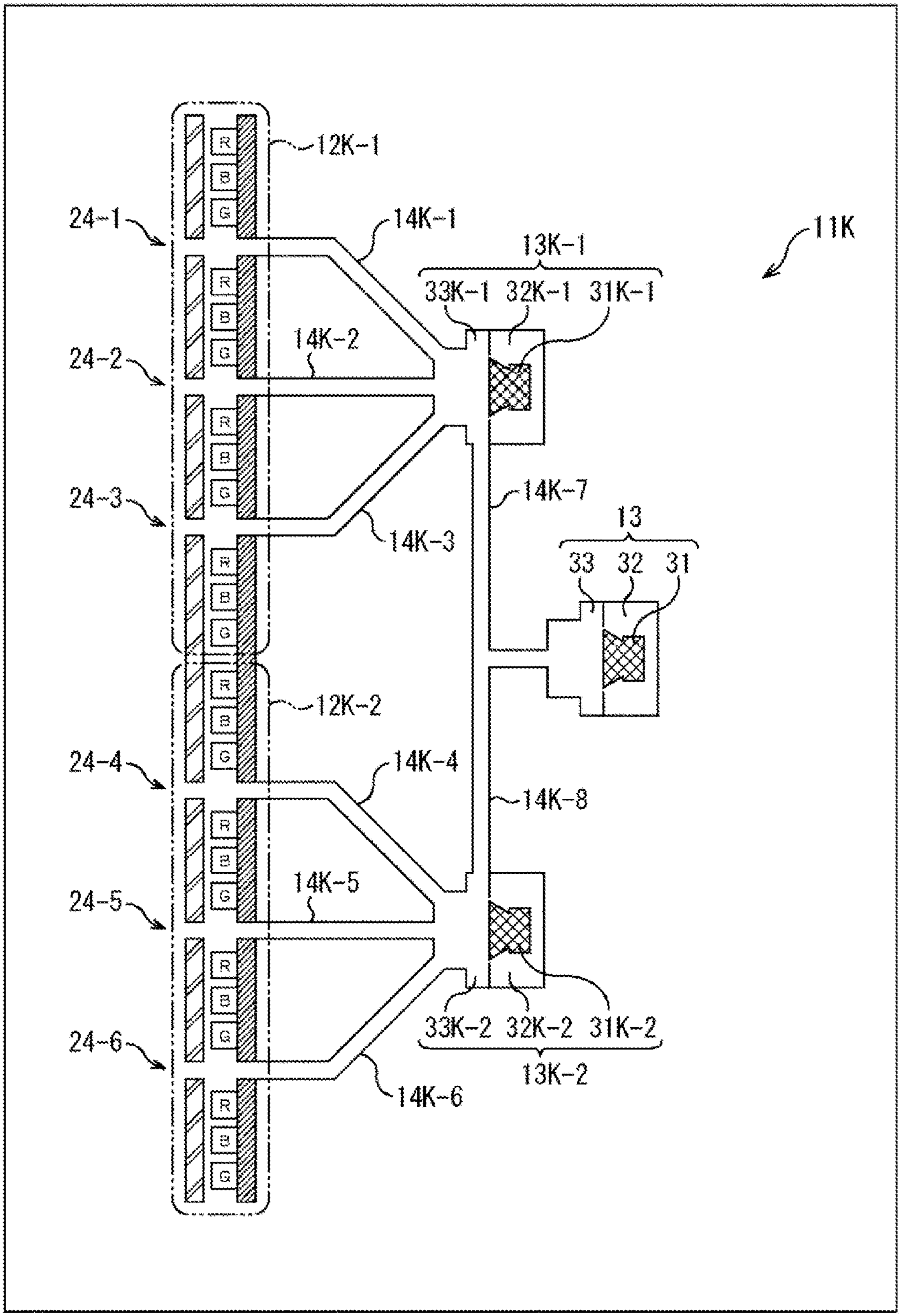
FIG. 13 is a diagram showing a modification of the ninth embodiment of the audiovisual presentation device.

Further, FIG. 13 shows a modification of the configuration example of the ninth embodiment of the audiovisual presentation device.

That is, in the audiovisual presentation device 11K shown in FIG. 13, the fine holes 24-1 to 24-3 of the display unit 12K-1 are connected to the air chamber 33K-1 of the speaker unit 13K-1 by the sound conduits 14K-1 to 14K-3. Similarly, the fine holes 24-4 to 24-6 of the display unit 12K-2 are connected to the air chamber 33K-2 of the speaker unit 13K-2 by sound conduits 14K-4 to 14K-6. The air chamber 33 of the speaker unit 13 is connected to the air chamber 33K-1 by the sound conduit 14K-7 and connected to the air chamber 33K-2 by the sound conduit 14K-8.

Thus, in the audiovisual presentation device 11K, one speaker unit 13 is connected to two display units 12K-1 and 12K-2, and the display units 12K-1 and 12K-2 include the speaker unit 13K-1 and 13K-2, respectively. In this case, the speaker body 31 of the speaker unit 13, the speaker body 31K-1 of the speaker unit 13K-1, and the speaker body 31K-2 of the speaker unit 13K-2 may be configured to output sounds of different frequency bands.

Configuration Example of Audiovisual Presentation System

An audiovisual presentation system configured by a plurality of audiovisual presentation devices 11 will be described with reference to FIGS. 14 to 17.

Figure 14:
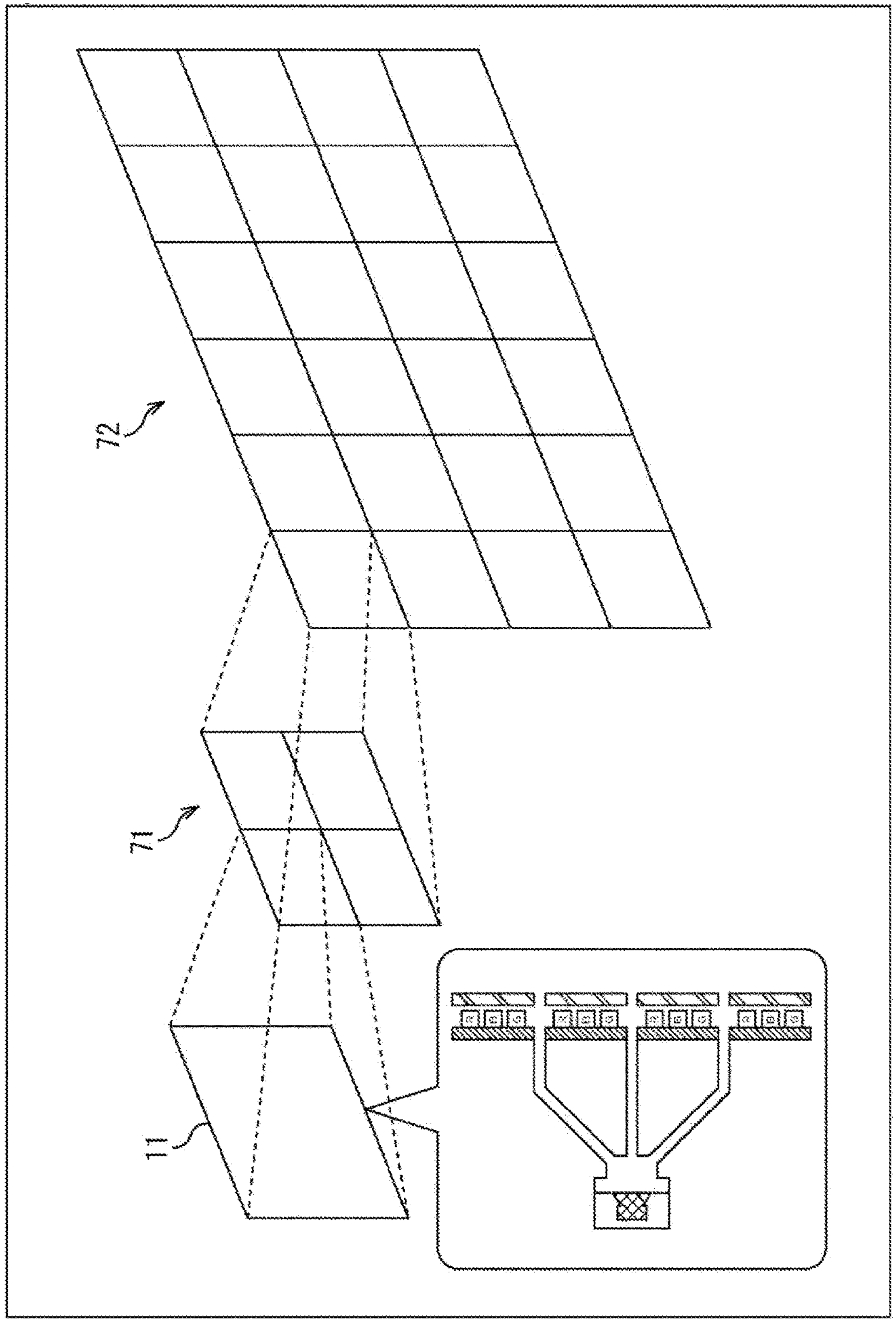
FIG. 14 is a diagram illustrating a perspective configuration example of an audiovisual presentation system.
Figure 15:
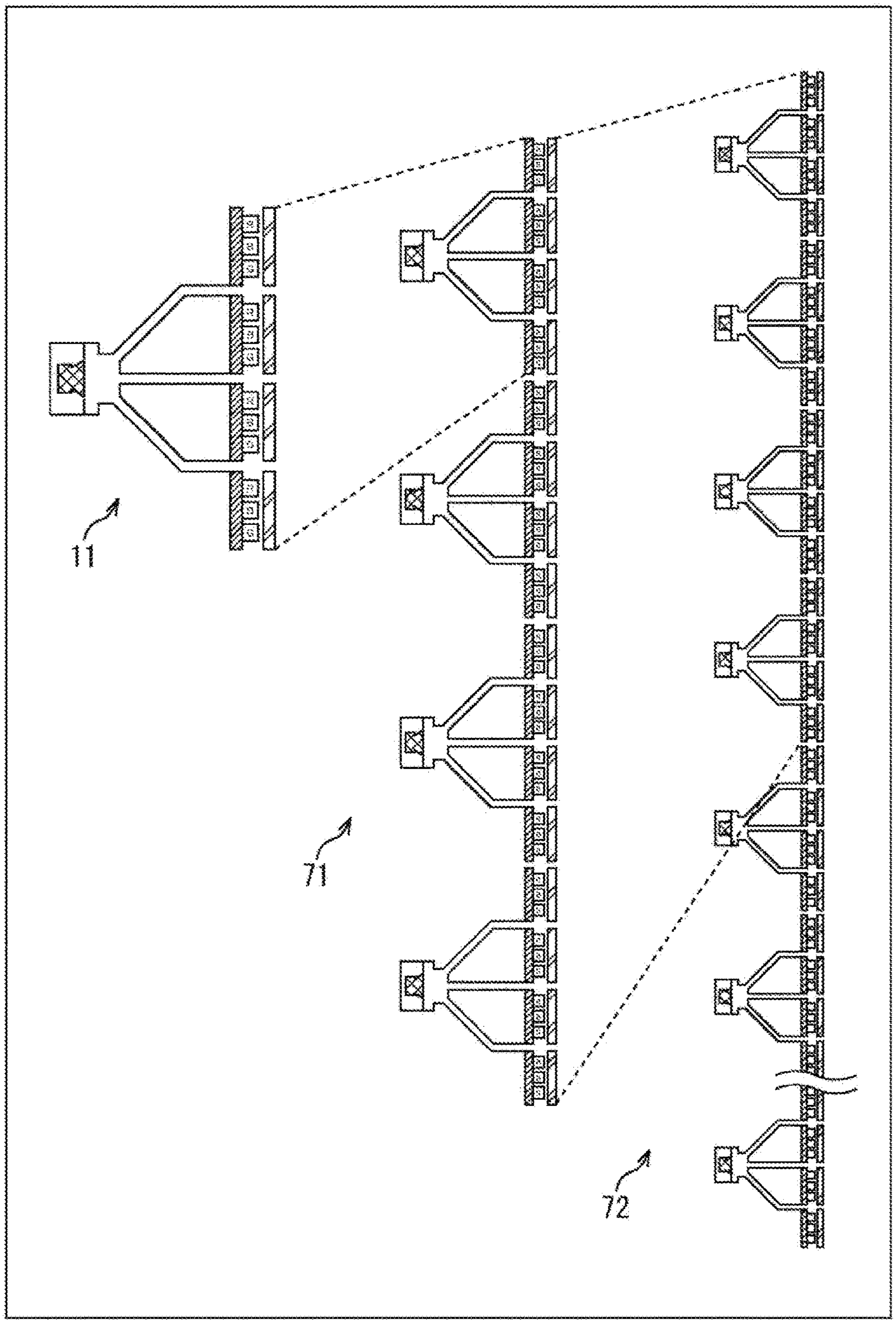
FIG. 15 is a diagram illustrating a cross-sectional configuration example of an audiovisual presentation system.

FIG. 14 is a diagram illustrating a perspective configuration example of an audiovisual presentation system 72, and FIG. 15 is a diagram illustrating a cross-sectional configuration example of the audiovisual presentation system 72.

For example, a set of a plurality of audiovisual presentation devices 11 constitutes a cabinet 71, and a set of a plurality of cabinets 71 constitutes the audiovisual presentation system 72. In the example shown in FIG. 14, four audiovisual presentation devices 11 are arranged in a 2×2 tile pattern to form the cabinet 71, and twenty-four cabinets 71 are arranged in a 6×4 tile pattern to form the audiovisual presentation system 72.

In the audiovisual presentation system 72 configured in this way, by controlling the output of the sound according to the sound source on the video displayed on each of the audiovisual presentation devices 11, for example, the sound image can be localized in accordance with the movement of the sound source.

Figure 16:
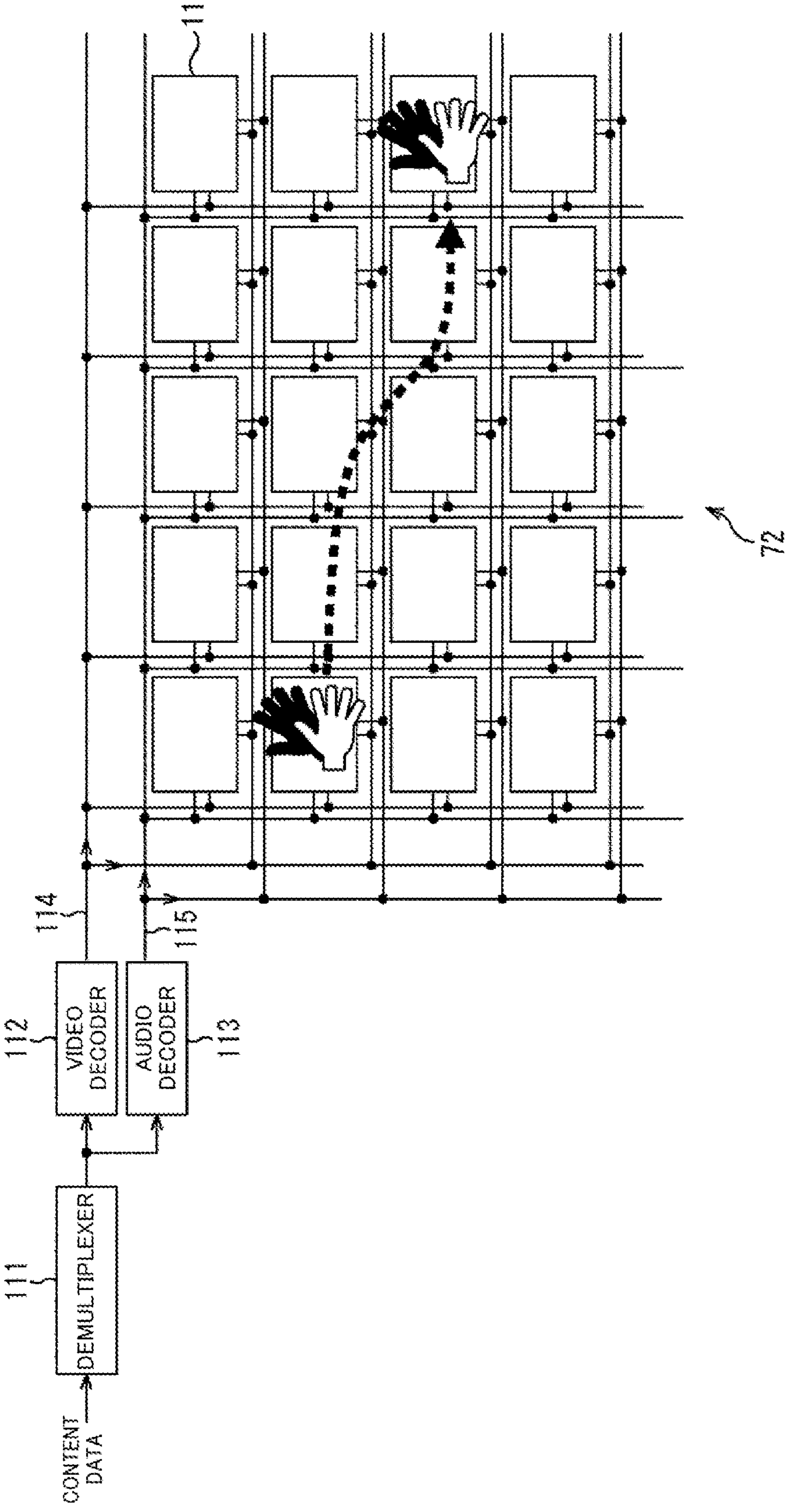
FIG. 16 is a block diagram showing a configuration example of an audiovisual presentation system.

As shown in FIG. 16, the audiovisual presentation system 72 further includes a demultiplexer 111, a video decoder 112, an audio decoder 113, a video output signal line 114, and an audio output signal line 115.

For example, content data input to the audiovisual presentation system 72 is input to the demultiplexer 111 and separated into video data and audio data. After the video data is input to the video decoder 112 and decoded, the video data is supplied to the audiovisual presentation devices 11 arranged in a tile pattern via the video output signal line 114. After the audio data is input to the audio decoder 113 and decoded, the audio data is supplied to the audiovisual presentation devices 11 arranged in a tile pattern via the audio output signal line 115.

Figure 17:
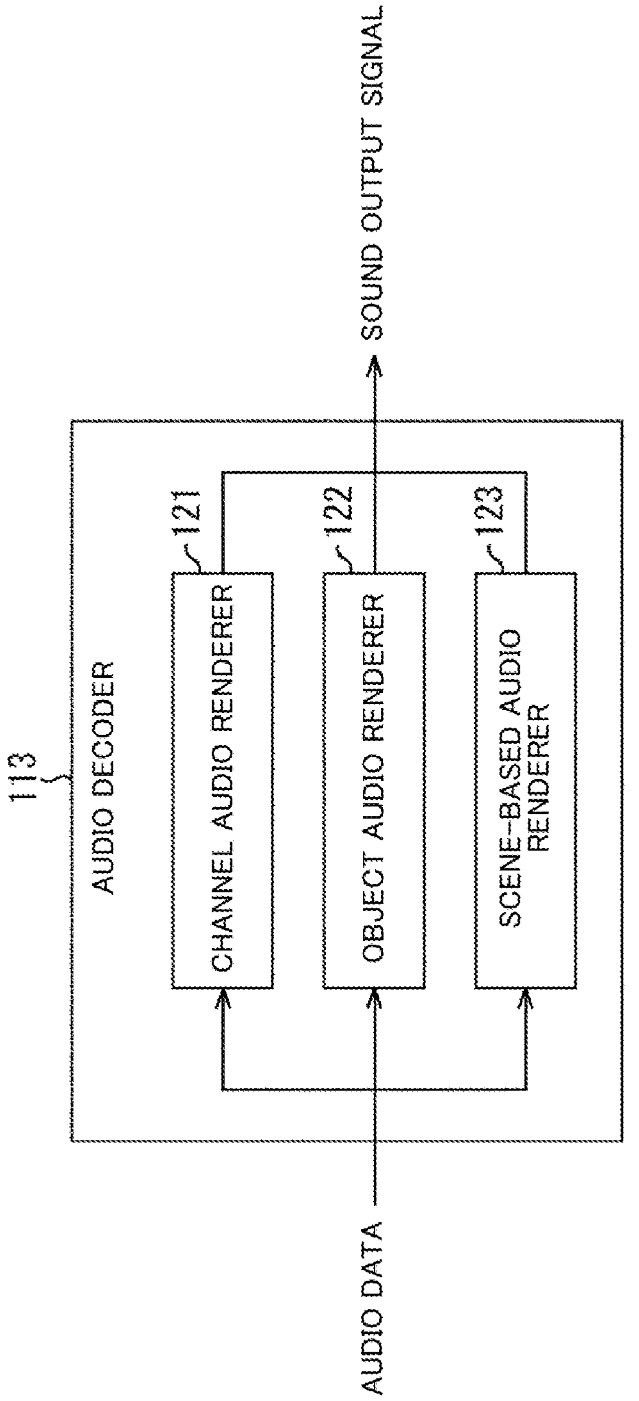
FIG. 17 is a block diagram showing a configuration example of an audio decoder.

FIG. 17 is a block diagram showing a configuration example of the audio decoder 113.

The audio decoder 113 includes a channel audio renderer 121, an object audio renderer 122 and a scene-based audio renderer 123.

That is, the audio decoder 113 is configured so that the object audio renderer 122 can handle object audio data. For example, in object audio, an audio signal and meta information are provided, and the object audio renderer 122 uses this information to generate audio signals.

The audio decoder 113 is configured so that the scene-based audio renderer 123 can handle the scene-based audio data. In scene-based audio, first-order or higher-order Ambisonics audio data is provided, and the scene-based audio renderer 123 uses this information to generate audio signals.

The audiovisual presentation system 72 is configured in this way, and by generating an audio signal according to the object audio data or the scene-based audio data, for example, it is possible to localize the sound image according to the movement of the sound source on the video. In FIG. 16, the sound source on the video is represented by the shape of a hand, and when the sound source moves as indicated by the dashed arrow, the audiovisual presentation system 72 can move the sound image localization so as to match the movement.

Computer Configuration Example

Next, the series of processing (signal processing method) described above can be executed by hardware or by software. In a case where the series of processing is executed by software, a program that configures the software is installed in a general-purpose computer or the like.

Figure 18:
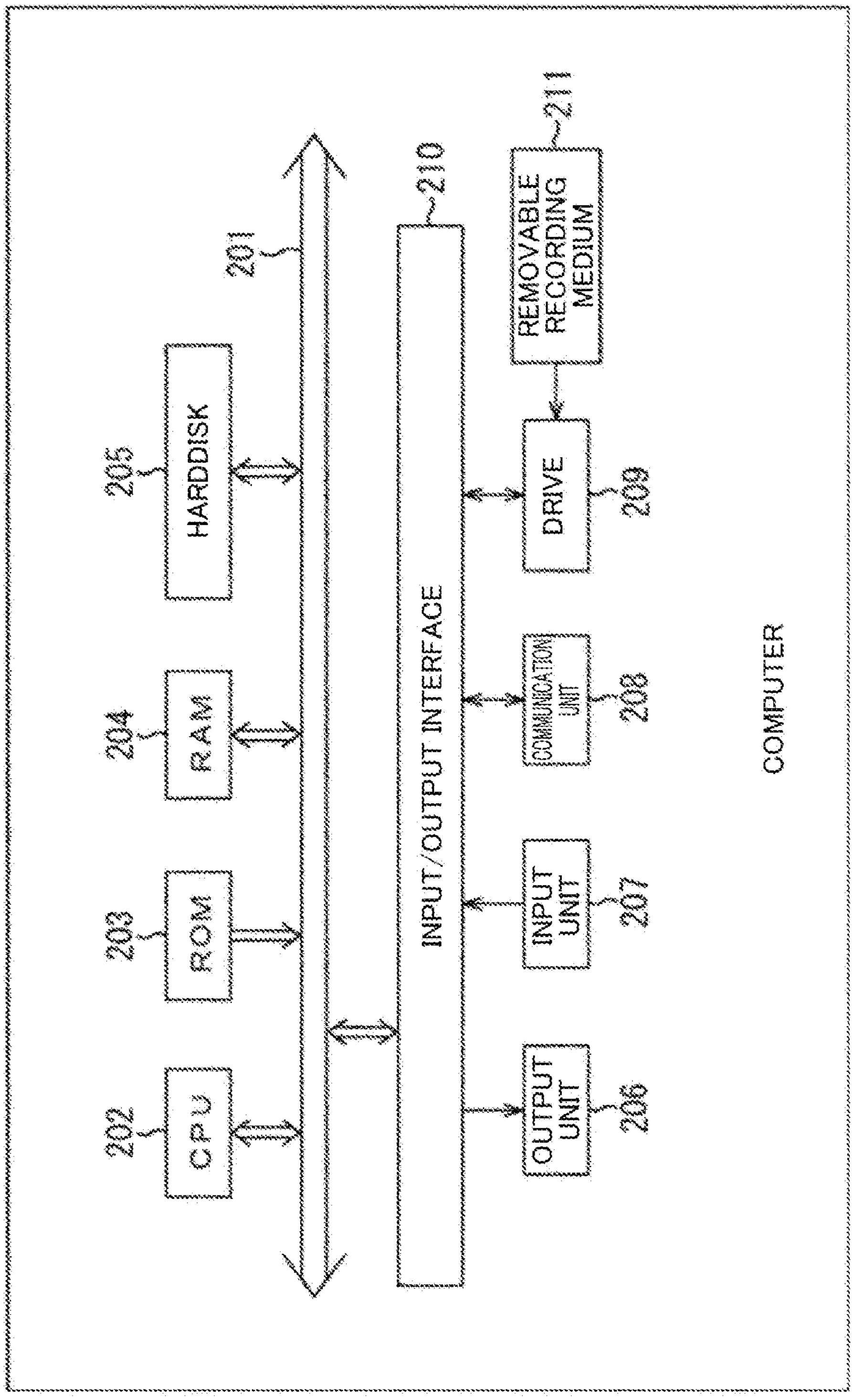
FIG. 18 is a block diagram showing a configuration example of an embodiment of a computer to which the present technology is applied.

FIG. 18 is a block diagram illustrating an exemplary configuration of an embodiment of a computer in which a program executing the above-described series of steps of processing is installed.

The program can be recorded in advance in the hard disk 205 or ROM 203 as a recording medium built into the computer.

Alternatively, the program can be stored (recorded) in removable recording medium 211 driven by drive 209. Such a removable recording medium 211 can be provided as so-called package software. Here, examples of the removable recording medium 211 include a flexible disc, a compact disc read-only memory (CD-ROM), a magneto-optical (MO) disc, a digital versatile disc (DVD), a magnetic disk, and a semiconductor memory.

The program can be installed in the computer from the removable recording medium 211 as described above, or can be downloaded to the computer via a communication network or broadcasting network and installed in the built-in hard disk 205. That is, for example, the program is transferred from the download site to the computer wirelessly via an artificial satellite for digital satellite broadcasting, or transferred to the computer by wire via a network such as a LAN (Local Area Network) or the Internet.

The computer contains a central processing unit (CPU) 202. An input/output interface 210 is connected to the CPU 202 via a bus 201.

When a user inputs an instruction by manipulating an input unit 207 through the input/output interface 210, the CPU 202 executes a program stored in a read-only memory (ROM) 203 in accordance with the instruction. Alternatively, the CPU 202 loads a program stored in the hard disk 205 into a random access memory (RAM) 204 and executes it.

As a result, the CPU 202 performs processing according to the above-described flowcharts or processing executed by components of the above-described block diagrams. Then, the CPU 202 causes an output unit 206 to output a processing result, causes a communication unit 208 to transmits the processing result, and causes the hard disk 205 to record the processing result, for example, via the input/output interface 210 as necessary.

The input unit 207 is composed of a keyboard, mouse, microphone, and the like. Further, the output unit 206 is configured by a liquid crystal display (LCD), a speaker, or the like.

Here, in the present specification, the processing performed by the computer in accordance with the program may not necessarily be performed chronologically in the order described in the flowchart. That is, the processing performed by the computer in accordance with the program also includes processing which is performed individually or in parallel (for example, parallel processing or processing by an object).

The program may be a program processed by one computer (processor) or may be distributed and processed by a plurality of computers. Furthermore, the program may be a program transmitted to a remote computer to be executed.

Moreover, in the present specification, a system means a collection of a plurality of constituent elements (including devices and modules (components)) regardless of whether all the constituent elements are contained in the same casing. Accordingly, a plurality of devices accommodated in separate casings and connected via a network and one device in which a plurality of modules are accommodated in one casing are all systems.

For example, a configuration described as one device (or processing unit) may be divided and configured as a plurality of devices (or processing units). On the other hand, the configuration described above as a plurality of devices (or processing units) may be collectively configured as one device (or processing unit). Further, of course, a configuration other than the above may be added to the configuration of each device (or each processing unit). Further, a part of a configuration of a device (or processing unit) may be included in a configuration of another device (or another processing unit) as long as a configuration or operation of the system as a whole is substantially the same.

Further, for example, the present technology may have a cloud computing configuration in which one function is shared with and processed by a plurality of devices via a network.

Further, for example, the above-described program can be executed in any device. In this case, the device only needs to have necessary functions (functional blocks, and the like) and to be able to obtain necessary information.

Further, for example, the respective steps described in the above-described flowchart may be executed by one device or in a shared manner by a plurality of devices. Furthermore, in a case where a plurality of steps of processing are included in one step, the plurality of steps of processing included in one step may be executed by one device or by a plurality of devices in a shared manner. In other words, it is also possible to execute the plurality of processing included in one step as processing of a plurality of steps. On the other hand, it is also possible to execute processing described as a plurality of steps collectively as one step.

For example, for a program executed by a computer, processing of steps describing the program may be performed chronologically in order described in the present specification or may be performed in parallel or individually at a necessary timing such as the time of calling. That is, the processing of the respective steps may be executed in an order different from the above-described order as long as there is no contradiction. Further, the processing of the steps describing this program may be executed in parallel with processing of another program, or may be executed in combination with the processing of the other program.

Note that the present technology described as various modes in the present description may be implemented independently alone as long as no contradiction arises. Of course, any plurality of technologies may be implemented together. For example, some or all of the present technologies described in several embodiments may be implemented in combination with some or all of the present technologies described in the other embodiments. A part or all of any above-described present technology can also be implemented together with another technology which has not been described above.

Combination Example of Configuration

The present technology can also be configured as follows.

(1)

An audiovisual presentation device comprising: a display unit in which light-emitting elements for displaying a video are arranged in an array on a substrate, and which has a plurality of fine holes formed in the substrate; a speaker unit having speakers that output sound according to an audio signal to an air chamber; and a plurality of sound conduits connecting the air chamber and the plurality of fine holes.

(2)

The audiovisual presentation device according to (1), wherein the plurality of sound conduits are configured in such a shape that path lengths from the air chamber of the speaker unit to the plurality of fine holes are substantially the same.

(3)

The audiovisual presentation device according to (1) or (2), wherein the plurality of sound conduits are configured in a shape in which an inner diameter increases from the air chamber of the speaker unit toward the plurality of fine holes.

(4)

The audiovisual presentation device according to any one of (1) to (3), further comprising: a plurality of opening/closing mechanisms for individually opening/closing the plurality of sound conduits.

(5)

The audiovisual presentation device according to any one of (1) to (4), further comprising: a plurality of micro speakers arranged in an array on the substrate of the display unit to output a higher-frequency sound than the speakers of the speaker unit.

(6)

The audiovisual presentation device according to any one of (1) to (5), further comprising: a plurality of opening/closing mechanisms for individually opening/closing the plurality of sound conduits; and a plurality of micro speakers arranged in an array on the substrate of the display unit to output a higher-frequency sound than the speakers of the speaker unit, wherein control of opening/closing by the plurality of opening/closing mechanisms and selection control of the plurality of micro speakers are performed according to a position of a sound source on a video displayed on the display unit.

(7)

The audiovisual presentation device according to any one of (1) to (6), wherein the speaker unit has a plurality of speakers, and those speakers are housed in the same or independent enclosures.

(8)

The audiovisual presentation device according to any one of (1) to (7), further comprising: a second speaker unit separate from the speaker unit, wherein an air chamber of the second speaker unit is connected to a desired sound conduit.

(9)

The audiovisual presentation device according to any one of (1) to (8), wherein the display unit and the plurality of sound conduits and the speaker unit are provided separately.

(10)

The audiovisual presentation device according to any one of (1) to (9), wherein a plurality of the display units are provided, and an air chamber of one speaker unit is connected to air chambers provided in the display units by a sound conduit.

(11)

The audiovisual presentation device according to (10), wherein a speaker unit is individually provided for each air chamber provided in the display unit.

(12)

The audiovisual presentation device according to any one of (1) to (11), wherein a plurality of the audiovisual presentation devices are arranged in a tile pattern to form an audiovisual presentation system.

(13)

The audiovisual presentation device according to (12), wherein an audio signal of audio output from each of the plurality of audiovisual presentation devices is generated according to object audio data or scene-based audio data.

(14)

A signal processing device for an audiovisual presentation device comprising: a display unit in which light-emitting elements for displaying a video are arranged in an array on a substrate, and which has a plurality of fine holes formed in the substrate; a speaker unit having speakers that output sound according to an audio signal to an air chamber; a plurality of sound conduits connecting the air chamber and the plurality of fine holes; a plurality of opening/closing mechanisms for individually opening/closing the plurality of sound conduits; and a plurality of micro speakers arranged in an array on the substrate of the display unit to output a higher-frequency sound than the speakers of the speaker unit, the signal processing device comprising: an opening/closing control unit that controls opening/closing by the plurality of opening/closing mechanisms; a selector unit that controls selection of the plurality of micro speakers; and a controller that controls the opening/closing control unit and the selector unit according to a position of a sound source on a video displayed on the display unit.

Note that embodiments of the present technology are not limited to the above-mentioned embodiments and can be modified in various manners without departing from the gist of the present technology. The advantageous effects described in the present specification are merely exemplary and are not limited, and other advantageous effects may be achieved.

REFERENCE SIGNS LIST

11 Audiovisual presentation device
12 Display unit
13 Speaker unit

14 Sound conduit
21 Circuit board
22 Light-emitting substrate
23 Transparent substrate
24 Fine hole
31 Speaker body
32 Enclosure
33 Air chamber
41 Opening/closing mechanism
51 Micro speaker
52 Speaker element
53 Enclosure
61 Sound conduit
71 Cabinet
72 Audiovisual presentation system
101 Signal processing device
102 Low-pass filter
103 Amplifier
104 High-pass filter
105 Delay element
106 Amplifier
107 Selector
108 Controller
109 Opening/closing control device
111 Demultiplexer
112 Video decoder
113 Audio decoder
114 Video output signal line
115 Acoustic output signal line
121 Channel audio renderer
122 Object audio renderer
123 Scene-based audio renderer

The invention claimed is:

1. An audiovisual presentation device, comprising:
a display unit that includes a substrate, wherein
the substrate includes light-emitting elements and a plurality of fine holes,
the light-emitting elements are arranged in first array on the substrate to display a video, and
the plurality of fine holes is in the substrate;
a first speaker unit that includes a plurality of speakers and a first air chamber, wherein the plurality of speakers is configured to output sound based on an audio signal to the first air chamber;
a plurality of sound conduits that connects the first air chamber to the plurality of fine holes; and
a plurality of opening and closing mechanisms configured to individually open or close each of the plurality of sound conduits.

2. The audiovisual presentation device according to claim 1, wherein a path length of the each of the plurality of sound conduits from the first air chamber of the first speaker unit to each of the plurality of fine holes is equal.

3. The audiovisual presentation device according to claim 1, wherein an inner diameter of the each of the plurality of sound conduits increases from the first air chamber of the first speaker unit toward the plurality of fine holes.

4. The audiovisual presentation device according to claim 1, further comprising:
a plurality of micro speakers in a second array on the substrate, wherein the plurality of micro speakers is configured to output a higher-frequency sound than the plurality of speakers of the first speaker unit.

5. The audiovisual presentation device according to claim 4, wherein the audiovisual presentation device is further configured to:
control the plurality of opening and closing mechanisms; and
control selection of the plurality of micro speakers based on a position of a sound source on the video displayed on the display unit.

6. The audiovisual presentation device according to claim 1, wherein
the plurality of speakers is housed in one of a same enclosure or independent enclosures.

7. The audiovisual presentation device according to claim 1, further comprising:
a second speaker unit different from the first speaker unit, wherein a second air chamber of the second speaker unit is connected to a specific sound conduit of the plurality of sound conduits.

8. The audiovisual presentation device according to claim 1, wherein the display unit, the plurality of sound conduits, and the first speaker unit are provided separately.

9. The audiovisual presentation device according to claim 1, further comprising a plurality of display units, wherein
the plurality of display units includes the display unit,
the plurality of display units includes a plurality of air chambers, and
the plurality of sound conduits is configured to connect the first air chamber of the first speaker unit to the plurality of air chambers of the plurality of display units.

10. The audiovisual presentation device according to claim 9, wherein each of the plurality of air chambers corresponds to a third speaker unit.

11. The audiovisual presentation device according to claim 1, wherein
a plurality of audiovisual presentation devices are in a tile pattern to form an audiovisual presentation system, and
the plurality of audiovisual presentation devices includes the audiovisual presentation device.

12. The audiovisual presentation device according to claim 11, wherein each of the plurality of audiovisual presentation devices is configured to generate the audio signal based on one of object audio data or scene-based audio data.

13. A signal processing device for an audiovisual presentation device, wherein
the audiovisual presentation device comprises:
a display unit that includes a substrate, wherein
the substrate includes light-emitting elements and a plurality of fine holes,
the light-emitting elements are in first array on the substrate to display a video, and
the plurality of fine holes is in the substrate;
a speaker unit that includes a plurality of speakers and an air chamber, wherein the plurality of speakers is configured to output sound based on an audio signal to the air chamber;
a plurality of sound conduits that connects the air chamber to the plurality of fine holes;
a plurality of opening and closing mechanisms configured to individually open or close each of the plurality of sound conduits; and
a plurality of micro speakers in a second array on the substrate, wherein the plurality of micro speakers is configured to output a higher-frequency sound than the plurality of speakers of the speaker unit, and
the signal processing device comprises:
an opening and closing control unit configured to control the plurality of opening and closing mechanisms;

a selector unit configured to control selection of the plurality of micro speakers; and a controller configured to control the opening and closing control unit and the selector unit based on a position of a sound source on the video displayed on the display unit.

* * * * *